United States Patent
Lalsangi et al.

(10) Patent No.: US 12,353,760 B2
(45) Date of Patent: Jul. 8, 2025

(54) KEY VALUE STORE WITH DISTRIBUTED SHARED ACCESS BY CLIENTS

(71) Applicant: NetApp Inc., San Jose, CA (US)

(72) Inventors: Nagaraj S. Lalsangi, Cary, NC (US); Arindam Banerjee, Fremont, CA (US); Timothy K. Emami, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 414 days.

(21) Appl. No.: 17/721,144

(22) Filed: Apr. 14, 2022

(65) Prior Publication Data
US 2022/0413765 A1 Dec. 29, 2022

Related U.S. Application Data

(60) Provisional application No. 63/215,883, filed on Jun. 28, 2021.

(51) Int. Cl.
*G06F 3/06* (2006.01)

(52) U.S. Cl.
CPC .......... *G06F 3/0659* (2013.01); *G06F 3/0604* (2013.01); *G06F 3/0638* (2013.01); *G06F 3/067* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| | | | | |
|---|---|---|---|---|
| 5,806,070 A | * | 9/1998 | Norman | G06F 3/0679 710/21 |
| 7,114,012 B2 | * | 9/2006 | Morishita | G06F 3/061 710/1 |

(Continued)

FOREIGN PATENT DOCUMENTS

EP          4123475 A1    1/2023

OTHER PUBLICATIONS

Laurent Bindschaedler et al. 2020. Hailstorm: Disaggregated Compute and Storage for Distributed LSM-based Databases. In Proceedings of ASPLOS '20. ACM. pp. 301-316. https://doi.org/10.1145/3373376.3378504 (Year: 2020).*

(Continued)

*Primary Examiner* — Daniel C. Chappell
(74) *Attorney, Agent, or Firm* — Cooper Legal Group, LLC

(57) ABSTRACT

Techniques are provided for hosting a key value store. A persistent storage backend is used to centrally host a key value store as disaggregated storage shared with a plurality of clients over a network fabric. A network storage appliance is connected to the plurality of clients over the network fabric, and is configured with a key value store interface. The key value store interface is configured to receive a key value command from a client. The key value store interface parses the key value command to identify a translation layer binding for a key value store targeted by the key value command. The key value store interface translates the key value command into a key value operation using the translation layer binding, and executes the key value operation upon the key value store.

27 Claims, 12 Drawing Sheets

(58) Field of Classification Search
CPC .............. G06F 3/00; G06F 3/06–0689; G06F
5/00–16; G06F 8/00–78; G06F 9/00–548;
G06F 11/00–3696; G06F 12/00–16; G06F
13/00–4295; G06F 15/00–825; G06F
16/00–986; G06F 18/00–41; G06F
17/00–40; G06F 21/00–88; G06F
2009/3883; G06F 2009/45562–45595;
G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | | |
|---|---|---|---|---|
| 7,120,739 B2* | 10/2006 | Fujimoto | ............... | G06F 3/0607 |
| | | | | 711/111 |
| 7,711,539 B1* | 5/2010 | Kimmel | ................ | G06F 3/0622 |
| | | | | 711/112 |
| 7,752,358 B2* | 7/2010 | Koga | ..................... | G06F 3/0608 |
| | | | | 361/679.01 |
| 7,814,289 B2* | 10/2010 | Inoue | ................... | G06F 3/0608 |
| | | | | 711/170 |
| 7,873,700 B2* | 1/2011 | Pawlowski | ........... | G06F 3/0607 |
| | | | | 709/213 |
| 8,032,697 B2* | 10/2011 | Kazar | ..................... | G06F 16/16 |
| | | | | 711/112 |
| 8,504,770 B2* | 8/2013 | Cuddihy | ............. | H04L 67/1097 |
| | | | | 711/114 |
| 8,600,949 B2* | 12/2013 | Periyagaram | ........... | G06F 3/067 |
| | | | | 707/664 |
| 8,745,338 B1* | 6/2014 | Yadav | ..................... | G06F 3/067 |
| | | | | 707/693 |
| 8,918,378 B1* | 12/2014 | Faith | ..................... | G06F 3/0626 |
| | | | | 707/695 |
| 9,575,974 B2* | 2/2017 | Muthyala | .............. | G06F 16/116 |
| 9,639,299 B2* | 5/2017 | Calder | .................. | G06F 3/0626 |
| 10,454,619 B2* | 10/2019 | Padmanabhan | ..... | G06F 11/1443 |
| 10,812,313 B2* | 10/2020 | Bakre | ................... | G06F 16/196 |
| 11,736,565 B2* | 8/2023 | Cherian | .............. | G06F 16/1824 |
| | | | | 709/250 |
| 11,928,367 B2* | 3/2024 | Markuze | ............... | G06F 3/0658 |
| 2004/0030668 A1* | 2/2004 | Pawlowski | ........... | G06F 3/0607 |
| 2013/0332694 A1* | 12/2013 | Reissner | ............... | G06F 3/0644 |
| | | | | 711/E12.078 |
| 2014/0081924 A1* | 3/2014 | Jennings | ............. | G06F 16/1824 |
| | | | | 707/687 |
| 2015/0112951 A1* | 4/2015 | Narayanamurthy | .. | G06F 16/172 |
| | | | | 707/694 |
| 2020/0169607 A1* | 5/2020 | Enz | ...................... | H04L 67/1097 |
| 2020/0293499 A1* | 9/2020 | Kohli | ...................... | G06F 3/067 |
| 2021/0157509 A1* | 5/2021 | Anchi | ................... | G06F 3/0635 |
| 2022/0232075 A1* | 7/2022 | Emerson | ............. | H04L 67/1097 |

OTHER PUBLICATIONS

Qin Zhang, Peng Li, Jizhong Han and Chengde Han, "Design and implementation of reconfigurable gateway array of multiple fabrics (RGAMF)," 2006 International Workshop on Networking, Architecture, and Storages (IWNAS'06), Shenyang, 2006, pp. 6 pp.-, doi: 10.1109/IWNAS.2006.25. (Year: 2006).*

Bindschaedler L., et al., "An Architecture for Load Balance in Computer Cluster Applications," Sep. 4, 2020, pp. 1-141, Retrieved from the Internet: URL:https://infoscience.epfl.ch/record/279523/files/EPFL_TH7207.pdf.

Bindschaedler L., et al., "Hailstorm Disaggregated Compute and Storage for Distributed LSM-based Databases," Proceedings of the 33rd Annual Acm Symposium on User Interface Software and Technology, 2020, pp. 301-316.

Extended European Search Report for Application No. EP22181578 mailed on Jan. 2, 2023, 14 pages.

Shin-Yeh Tsai, et al.; Disaggregating Persistent Memory and Controlling Them Remotely: An Exploration of Passive Disaggregated Key-Value Stores; 16 Pgs.

Chenyuan Wu, et al.; FlexChain: An Elastic Disaggregated Blockchain; 14 Pgs.

Mohammad Ewais, et al.; Disaggregated Memory in the Datacenter: A Survey; Feb. 28, 2023; 25 Pgs.

Jiacheng Shen, et al.; FUSEE: A Fully Memory-Disaggregated Key-Value Store; Feb. 21-23, 2023; 18 Pgs.

* cited by examiner

KEY VALUE STORE WITH DISTRIBUTED SHARED ACCESS BY CLIENTS

CROSS-REFERENCE TO RELATED APPLICATIONS

This application claims priority to U.S. Provisional Patent Application, titled "DISAGGREGATED KEY VALUE STORE", filed on Jun. 28, 2021 and accorded Application No. 63/215,883, which is incorporated herein by reference for all purposes.

TECHNICAL FIELD

Various embodiments of the present technology relate to key value stores. More specifically, some embodiments relate to key value stores with distributed shared access by clients.

BACKGROUND

Databases are often used by storage systems for storing, retrieving, and managing data on behalf of clients. There are various types of databases that a storage system could utilize, such as a relational database, an object-oriented database, a hierarchical database, a key value store, and/or a variety of other types of databases.

Traditional relational databases have historically been the most commonly used type of database. Relational databases provide a predefined database structure with predefined data types. By predefining the database structure and data types, this information can be exposed to the database program and allow for certain optimizations. For example, data can be stored in tables comprised of rows and columns. Each column of a table can be assigned a data type, such as a date, text, an integer number, etc. Each row in the table has a place for a value for each column even if that entry has no data to be stored (e.g., a "null" value).

Traditional relational databases have various limitations that make them less desirable or completely unsuitable for many storage use cases. A traditional relational database, for example, is unable to scale out to store large quantities of data across different servers because traditional relational databases are designed to run on a single server in order to maintain integrity of table mappings. As another example, relational databases allocate memory for the different data entries even when there is no data to be stored within a particular field. This results in an increase in memory usage. As a result, these limitations negatively affect performance, increase latency, and can result in data availability issues if the only server hosting a database fails. Also, relational databases are only able to store data in tabular form, which makes representing complex relationships between objects difficult.

Instead of viewing data in the row and column format of relation databases, key value stores treat data as a collection of data. Each record within may have different fields thereby allowing considerable flexibility since entry structure does not have to be predefined and optional values are not represented by empty placeholders. Moreover, the key-value format used by key value stores to store and retrieve data can be very fast for write and read operations. Data (e.g., a string, a complex object, a music file, a picture, etc.) may be stored as a value data item in the key value store. In order to locate the value data item, the value data item may be paired with a unique key used to identify/reference the value data item. In this way, the value data item and the key may be stored in the key value store as a key-value pair. Typical use cases for key value stores include, but are not limited to, session management at a high scale, user preference and user profile storage, content recommendation storage, a cache for frequently accessed but rarely updated data, and the like.

SUMMARY

Various embodiments of the present technology relate to key value stores in disaggregated storage systems. More specifically, some embodiments relate to key value stores with distributed shared access by clients. According to some embodiments, a storage system is provided that includes one or more persistent storage backends and one or more network storage appliances. The persistent storage backend can be configured to centrally host a key value store as disaggregated storage shared with a plurality of clients over a network fabric. The network storage appliance can be connected to the plurality of clients over the network fabric. The key value store interface can be configured to receive a key value command from a client over the network fabric, parse the key value command to identify a translation layer binding associated with the key value store targeted by the key value command, translate the key value command into a key value operation using the translation layer binding, and/or execute the key value operation upon the key value store. In some embodiments, the key value store interface is configured to provide variable sized access to the key value store, and the network storage appliance is configured with at least one block interface configured to provide block-based access to block storage, a file interface configured to provide file-based access to files, or an object interface configured to provide object based access to objects within an object store.

According to some embodiments, the key value store interface is configured to implement a non-volatile memory express over fabric (NVMe-oF) stack to process commands from the plurality of clients for access to the key value store and to persistently store values based upon keys associated with the values. The key value store interface may also be configured to discover a plurality of persistent storage backends hosting a plurality of key value stores implementing different API sets and generate translation layer bindings for each key value store of the plurality of key value stores. The translation layer binding for the key value store is configured to convert key value commands received over the network fabric to key value operations according to semantics and a media specific API set of the key value store and the persistent storage backend storing the key value store.

Using a configurable registration mechanism, some embodiments of the key value store interface can generate mappings that map key value stores to key value store namespaces based upon key value store attributes of the key value stores. The key value store interface can also be configured to initialize the key value store based upon a configuration defining attributes of the key value store and defining an API discovery mechanism for discovering a media specific API set of the key value store.

According to some embodiments, the key value store interface can generate and bind, based upon the configuration, the translation layer binding to the key value store and the media specific API set of the key value store used to service key value operations. According to some embodiments, the key value store interface can associate a non-volatile memory express over fabric (NVMe-oF) namespace with the key value store based upon the configuration.

Some embodiments include a system having a plurality of persistent storage backends within which a plurality of key value stores are hosted as disaggregated storage shared with a plurality of clients over a network fabric. The plurality of key value stores may implement different API sets. The system can also include a plurality of network storage appliances configured as a cluster to provide the plurality of clients with access to the plurality of key value stores. Some or all of the network storage appliances can include a key value store interface configured to generate translation layer bindings for each key value store of the plurality of key value stores. The translation layer binding for a key value store can convert key value commands, received over the network fabric, according to semantics and an API set associated with the key value store and a persistent storage backend storing the key value store. The key value interface can also translate, using the translation layer bindings, key value commands received over the network fabric from the plurality of clients into key value operations for execution upon corresponding key value stores.

According to some embodiments, a key value store interface hosted by a network storage appliance can be used to provide a plurality of clients with access over a network to a centralized key value store as shared network attached storage according to key value store semantics. The semantics can expose the centralized key value store to the plurality of clients as variable sized storage units for storing the variable sized data blobs and variable sized metadata in some embodiments. The semantics may also be used to expose the centralized key value store to the plurality of clients for direct non-hierarchical access to variable sized metadata and the variable sized data blobs identifiable using the keys.

The key value store interface can receive variable sized data blobs and hashes of the variable sized data blobs according to the key value store semantics from the plurality of clients. The variable sized data blobs can then be stored as values and the hashes as keys into the centralized key value store. Access to a distributed file system can be maintained through a plurality of nodes hosted as stateless containers. The distributed file system is used to provide access to the variable sized data blobs and keys stored within the centralized key value store.

In some embodiments, the centralized key value store can be scaled out with additional disaggregated scale-out persistent network attached storage for the centralized key value store. A centralized journal can be maintained within the network attached persistent memory for a distributed file system implemented through the centralized key value store. A node is configured to log information (e.g., in-flight write operations being processed by the node) into the centralized journal. A plurality of nodes can be provided with access to the information logged into the centralized journal by the node. The key value store interface may maintain a non-volatile memory log within the shared network attached storage. Nodes may log in-flight write operations into the non-volatile memory log. These nodes may be hosted through stateless containers. If a node hosted through a stateless container fails, then a second node can be hosted through a second stateless container to take over for the first node. The second node is provided with access the non-volatile memory log for replaying the in-flight write operations logged into the non-volatile memory log by the first node.

In some embodiments, the plurality of clients are provided with access to network attached non-volatile memory devices for offloading metadata of applications to the network attached non-volatile memory devices.

Some embodiments include a non-transitory machine readable medium is provided. The non-transitory machine readable medium comprises instructions, which when executed by a machine, causes the machine to perform operations. These operations cause the machine to host a network storage appliance as a stateless container connected over a network to a centralized key value store as shared network attached storage accessible to the network storage appliance and a plurality of other network storage appliances according to key value store semantics. The network storage appliance may utilize a key value store interface used to access the centralized key value store. The network storage application uses the key value store interface to format a key value command into a key value operation according the key value store semantics. The key value command comprises a variable sized data blob and a key. The network storage appliance receives an acknowledgement, from the key value store interface, that the variable sized data blob and key were stored within the centralized key value store.

The network storage appliance uses the key value store interface to offload in-flight write operations into a non-volatile memory log of the shared network attached storage for access by the network storage appliance and the plurality of other network storage appliances. The network storage appliance uses the key value store interface to offload metadata to network attached non-volatile memory of the shared network attached storage for access by the network storage appliance and the plurality of other network storage appliances.

In some embodiments, the network storage appliance uses the key value store interface to host, through a storage layer associated with the key value store interface, one or more microservices configured to provide storage functionality for the centralized key value store. In some embodiments, functionality is offloaded from an application layer associated with the network storage appliance to the storage layer hosted within a computing environment associated with the centralized key value store. In some embodiments, network storage appliance uses the key value store interface to append erasure codding information to the variable size data blob.

Some embodiments include a computing device with a processor coupled to memory comprising machine executable code is provided. The processor executes the machine executable code to cause the computing device to perform operations including providing, by a key value store interface hosted by a network storage appliance, a plurality of clients with access over a network to a centralized key value store as shared network attached storage according to key value store semantics. The key value store interface receives variable sized data blobs and keys associated with the variable sized data blobs according to the key value store semantics from the plurality of clients for storage within the centralized key value store. The key value store interface packs the variable sized data blobs and keys into fixed size blocks used by storage devices of the shared network attached storage. The key value store interface stores the fixed size blocks into the shared network attached storage of the centralized key value store. In response to receiving a request from a client for a variable sized data blob associated with a key, the key is utilized to identify the variable sized data blob within the centralized key value store. The variable sized data blob is reconstructed utilizing data of the variable sized data blob stored within one or more fixed size blocks of the shared network attached storage of the centralized key value store. In this way, the variable sized data blob is transmitted back to the client.

DESCRIPTION OF THE DRAWINGS

Embodiments of the present technology will be described and explained through the use of the accompanying drawings in which.

Figure 1:
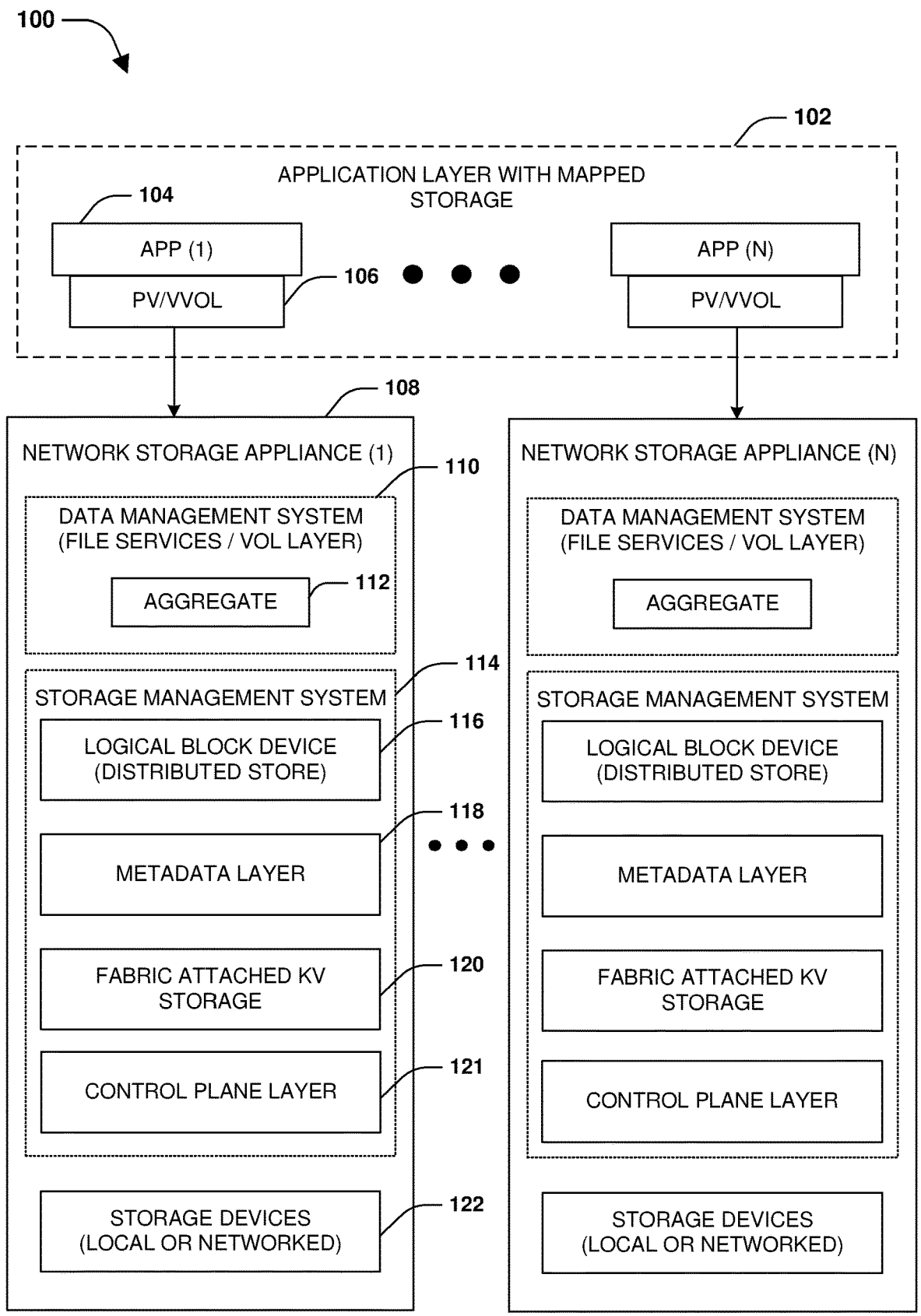
FIG. 1 is a block diagram illustrating an example of a distributed storage environment hosting a cluster of network storage appliances in accordance with an embodiment of the technology.

The drawings have not necessarily been drawn to scale. Similarly, some components and/or operations may be separated into different blocks or combined into a single block for the purposes of discussion of some embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A network storage appliance provides clients with storage functionality that is accessible to the clients over a network to which the clients and the network storage appliance are attached. The network storage appliance may include locally attached storage within which the network storage appliance may store data on behalf of the clients. In this way, the locally attached storage is exposed over the network to the clients as network attached storage that is managed by the network storage appliance. The network storage appliance also integrates storage controller functions with the locally attached storage. The storage controller functions may provide various storage functionality for the locally attached storage, such as compression, deduplication, backup and restore functionality, etc. The storage controller functions may store data within the locally attached storage as files, blocks of data, key values of a key value store, databases, etc.

Conventional network storage appliances often provide clients with access to network storage using various interfaces. For example, conventional network storage appliances may implement a file interface that provides clients with access to files stored on the network storage or a block interface that provides clients with access to blocks of data stored on the network storage. Conventional network storage appliance may also locally implement a key value store within locally attached storage of the network storage appliance. Because the entire key value store is locally stored within the locally attached storage of the network storage appliance, the network storage appliance has direct access to the key value store through a conventional storage interface used to access locally attached storage. Because the key value store is located within the locally attached storage of the network storage appliance, if the network storage appliance fails, then clients will no longer be able to access the key value store within the locally attached storage. This is because the key value store is locally implemented at only the network storage appliance, and is thus a single point of failure.

In contrast, various embodiments of the present technology integrate a key value store interface into network storage appliances so that the network storage appliances can provide shared network attached access to a centralized key value store that can be accessed through any of network storage appliances. In some embodiments, the centralized key value store can be hosted on disaggregated storage as a disaggregated key value store where the underlying storage of the disaggregated storage may be composed of any number and/or combinations of different types of storage, such as solid-state storage, non-volatile memory express over fabric (NVMe-oF), flash storage, etc. Thus, the disaggregated key value store may be backed by heterogeneous types of storage, in some embodiments.

Unlike conventional interfaces, such as block and file interfaces, the key value store interface is configured to generate and utilize translation layer bindings (e.g., a flash translation layer binding for flash storage media) that are each tailored to different types of persistent storage used to store the centralized key value store. These translation layer bindings are used to translate/transform a key value command (e.g., a command from a client to store or retrieve a variable sized data blob as a value data item) into a key value operation.

The key value operation is formatted according to semantics and an API set of a key value store targeted by the key value command. The semantics may relate to the format of operations natively supported by a particular type of key value store/persistent storage media. The semantics may relate to variables, functions, syntax, and parameter of operations recognized by that particular type of key value store/persistent storage media. Such operations may relate to a put key value operation to store a key value pair, a get key operation to retrieve a key value pair, a delete operation to delete a key value pair, a range query operation to read a range of key value pairs, a post operation, and/or other operations.

The techniques described herein are directed to implementing a key value store as the centralized key value store that can be accessed in a distributed fashion from multiple clients. That is, the key value store is fabric attached and centrally hosted for shared access by a plurality of clients. In some embodiments, a network storage appliance or cluster of network storage appliances are configured to provide the plurality of clients with access to the key value store. In particular, the network storage appliances provide access to the key value store through the use of a key value store interface. The key value store interface is implemented by a network storage appliance in order to provide the clients with variable sized access to the key value store, as opposed to being limited to fixed block size access. In this way, the clients can store variable sized data blobs as value data items within the key value store. The value data items are associated with keys (e.g., a key for a value data item may correspond to a hash of the value data item), and thus are stored as key-value pairs within the key value store. A key of a key-value pair may be used to retrieve the value data item of the key-value pair from the key value store.

The key value store interface is configured to discover persistent storage backends hosting key value stores. These key value stores may implement different API sets and/or may be hosted by different types of persistent storage backends (e.g., HDDs, SSDs, SCM storage, cloud storage, etc.). The key value store interface is configured to generate translation layer bindings for each key value store. A translation layer binding may be generated for a key value store based upon an API set of the key value store and a type of persistent storage backend hosting the key value store. These translation layer bindings are customized by the key value store interface for interpreting the specific API sets of each key value store. A translation layer binding is used to translate/transform a key value command (e.g., a command from a client to store or retrieve a variable sized data blob as a value data item) into a key value operation that is formatted according to semantics and an API set of a key value store targeted by the key value command. In this way, the key value operation can be processed by the API set of the key value store.

The key value store interface may utilize a non-volatile memory express over fabric (NVMe-oF) stack for processing and transforming the key value commands using the translation layer bindings. The key value store interface is configured to discover and map key value stores to key value store namespaces that are exposed to the clients for accessing the key value stores. In this way, the network storage appliances utilize the key value store interface for exposing the discovered key value stores as key value stores that are fabric attached with shared access by the plurality of client devices.

Conventional network storage appliances are configured with interfaces that provide clients with access to storage. For example, a network storage appliance may comprise a block interface that provides clients with block-based access to block storage, such as where a client may read one or more 4 kb fixed size blocks of data from a storage device. In an embodiment, network storage appliance may comprise a file interface that provides clients with file-based access to files. In an embodiment, the network storage appliance may comprise an object interface that provides clients with object-based access to objects stored within an object store. However, these network storage appliances that can provide clients with access over a network to storage lack the ability to provide the clients with access to a key value store that is shared amongst the clients. This is because the interfaces of the network storage appliances are unable to receive, interpret, and translate/transform commands from clients into key value operations for execution upon a key value store.

In order to provide clients with shared access to a key value store, the techniques described herein are directed to the implementation of a key value store interface. The key value store interface may be integrated into network storage appliances so that the network storage appliances may provide clients with shared access over a network fiber to a key value store that is centrally hosted by a persistent storage backend. The key value store interface is natively integrated at a storage fabric layer into the network storage appliances for key-value mapping. This enables the ability to provide distributed access to the key value store for multiple stateless clients that form a distributed file system or application. By employing fabric accessible persistent storage with key value semantics, variable sized data blobs or metadata can be stored with hashes as keys for multiple clients. In this way, disaggregated scale-out storage using a scalable key value store interface is provided.

It may be appreciated that a key value store is at times referred to as a key value store, a disaggregated key value store (e.g., due to the disaggregated access provided for the key value store and/or how the disaggregate key value store may be backed by disaggregated storage composed of heterogeneous types of storage devices), and/or a centralized key value store (e.g., due to the key value store being centrally located and shared amongst multiple clients), and thus a key value store, a disaggregated key value store, and/or a centralized key value store may comprise any type of key value store and/or refer to the same type of key value store.

The present technology implements a native key value store interface that enables a fabric accessible key value store, where a plurality of clients are provided with shared access to the key value store. One or more key value stores may be implemented according to a scale-out disaggregated storage design pattern where a plurality of network storage appliances can provide clients with access to the one or more key value stores as key value stores. The network storage appliances may provide a composable scale-out persistent layer with virtual shelves and/or smart enclosures. Various types of persistent storage backends may be used to store the key value stores, such as SSD storage, HDD storage, SCM storage, cloud storage, and/or other types of storage media. The key value store interface provides clients with the ability to store variable sized content as value data items associated with keys are key-value pairs. A plurality of network storage appliances may be clustered together for providing enhanced storage efficiency in relation to the key value stores.

Various embodiments of the present technology provide for a wide range of technical effects, advantages, and/or improvements to computing systems and components. For example, various embodiments may include one or more of the following technical effects, advantages, and/or improvements: 1) integrating a key value store interface into a network storage appliance as a unique and customized system that implements unconventional computer operations to connect multiple clients with shared access over a network fabric to a key value store hosted by a persistent storage backend such that the clients may be implemented as stateless clients; 2) storing variable sized data blobs and metadata from multiple clients into the key value store; 3) scaling out access to the key value store by implementing a cluster of network storage appliances each having key value store interfaces for discovering, managing, and providing access to the key value store; 4) creating a native variable sized "block" data store through the key value store by the key-value interface in order to reduce memory and processing resource consumption otherwise consumed by clients having to pack and unpack data according to fixed block sizes; 5) executing key value store services in an aggregated manner in order to amortize memory and processing resource consumption across multiple applications as a cost-efficient solution; 6) storing data and metadata without the overhead of a directory and/or metadata hierarchy otherwise used by other network file systems such as NFS so that clients may store the data and metadata in a simple and efficient manner; 7) offloading the logging of in-flight write operations associated with non-volatile (NV) memory sharing from nodes so that the nodes may be implemented as simple state-less storage controllers; 8) implementing fabric attached non-volatile memory devices with shared access to applications so that the applications can offload metadata in order to reduce memory consumption (e.g., DRAM consumption) in application nodes, reduce the overall cost of application deployment on nodes/servers, and provide efficient metadata lookups such as through a single lookup operation as opposed to multiple lookup operations; 9) using unconventional and non-routine operations to create a key value store interface that is capable of providing multiple clients with shared network attached access to a centralized key value store; and/or 10) enhancing the functionality of data storage systems and/or network appliances.

In the following description, for the purposes of explanation, newer specific details are set forth in order to provide a thorough understanding of embodiments of the present technology. It will be apparent, however, to one skilled in the art that embodiments of the present technology may be practiced without some of the specific details. While, for convenience, embodiments of the present technology are described with reference to network storage appliances and key value stores, embodiments of the present technology are equally applicable to various other types of hardware, software, and/or storage.

The phrases "in some embodiments," "according to some embodiments," "in the embodiments shown," "in one embodiment," and the like generally mean the particular feature, structure or characteristic following the phrase is included in at least one implementation of the present technology, and may be included in more than one implementation period in addition such phrases do not necessarily refer to the same embodiment or different embodiments.

FIG. 1 is a block diagram illustrating an example of a distributed storage environment 100 hosting a cluster of network storage appliances 108 in accordance with an embodiment of the technology. The cluster of network storage appliances 108 is implemented in a scale out manner where any number of network storage appliances can be added to the cluster of network storage appliances 108 in order to dynamically adjust to the number of clients accessing a key value store through key value store interfaces of the network storage appliances. In the embodiments illustrated in FIG. 1, the distributed storage environment 100 includes an application layer 102 and cluster of network storage appliances 108 that implement a key value store as fabric attached key value storage 120. The distributed storage environment 100 may also include an application layer 102 within which one or more applications may be hosted (e.g., a first application 104). The application layer 102 may comprise any type of application hosting environment, such as applications hosted in containers executing on nodes of a container orchestration platform (e.g., Kubernetes), an operating system application layer of a client device, etc. The applications hosted by the application layer 102 may be hosted within the same client device or across different client devices The application layer 102 may provide storage mapping functionality used to map storage mounted by the applications to backend storage hosted by the plurality of network storage appliances. In some embodiments, the application layer 102 may provide storage mapping functionality 106 for the first application 104. The storage mapping functionality 106 may map physical volume block numbers to virtual volume block numbers of storage made accessible by the distributed storage environment 100 to the first application 104. The storage mapping functionality 106 may be used to by the application layer 102 to access an aggregate 112 of storage (e.g., access to volumes stored within the aggregate 112) hosted by a first network storage application 108 of the distributed storage environment 100. The aggregate 112 may be hosted by a data management system 110 of the first network storage appliance 108. The data management system 110 is a frontend component of the first network storage application 108 through which clients can access and interface with the first network storage application 108, such as to perform key value commands upon a key value store. For example, the first application 104 may generating a key value command targeting storage allocated to the first application 104 by the first network storage appliance 108, such as a volume of the aggregate 112 whose data is stored through the fabric attached key value storage 120 within the key value store on the storage devices 122. The application layer 102 may utilize the storage mapping functionality 106 to route the key value command to the data management system 110 for further processing.

The data management system 110 may implement file services and a volume layer. The file services and volume layer may be implemented by storage operating system instances hosted by the data management system 110. In some embodiments, a storage operating system instance may run on an operating system (e.g., Linux) as a process and may support various protocols, such as NFS, CIFS, and/or other file protocols through which applications may access files through a volume layer provided by the storage operating system instance to the applications. The storage operating system instance may provide an API layer through which the first application 104 may set configurations (e.g., a snapshot policy, an export policy, etc.), settings (e.g., specifying a size or name for a volume), and transmit I/O operations directed to volumes (e.g., FlexVols of the aggregate 112) exported to the first application 104 by the storage operating system instance. In this way, the applications can communicate with the storage operating system instance through this API layer. The data management system may be specific to the first network storage appliance 108 (e.g., as opposed to a storage management system (SMS) 114 that may be a distributed component amongst network storage appliances). In some embodiments, the data management system 110 and/or the storage management system 114 may be hosted within a container managed by a pod on the first network storage appliance 108. In response to the data management system 110 receiving the key value command, the data management system 110 may route the key value command to the storage management system 114.

The storage management system 114 is a distributed backend (e.g., instances of the storage management system may be distributed amongst the plurality of network storage appliances) used to store data as key-value pairs through fabric attached key value storage 120 in a key value store of a persistent storage backend of the distributed storage environment 100. Thus, the key value store may be hosted through the persistent storage backend by the storage management system 114. As part of hosting the key value store, the storage management system 114 implements a logical block device 116 as part of a distributed store used to host the key value store. The storage management system 114 includes a metadata layer 118 used to map the logical block device 116 to the fabric attached key value storage 120 stored on the storage devices 122 of the persistent storage backend of the distributed storage environment 100 as the key value store. The storage management system 114 includes a control plane layer 121, which is further described in relation to FIG. 2.

Figure 2:
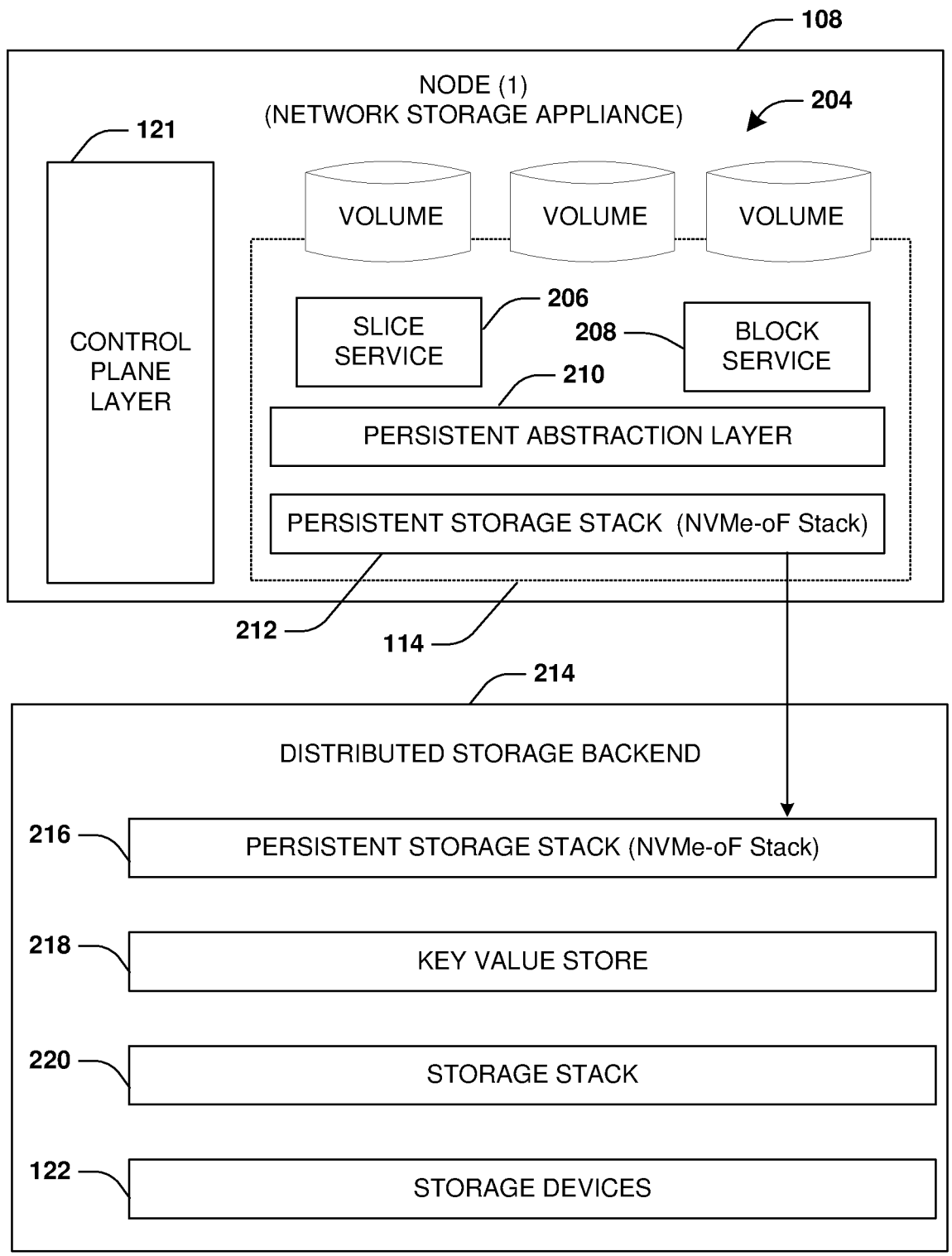
FIG. 2 is a block diagram illustrating an example of a network storage appliance in accordance with an embodiment of the technology.

FIG. 2 is a block diagram illustrating an example of the first network storage appliance 108 in accordance with an embodiment of the technology. The first network storage appliance 108 may comprise the control plane layer 121. The control plane layer 121 is configured to implement a slice service 206 and a block service 208 used to provide storage to the first application 104 and/or other applications through volumes 204 of the aggregate 112 backed by the key value store 218. In particular, the control plane layer 121 may host a full operating system with a frontend and a backend storage system. The control plane layer 121 may form a control plane that includes control plane services, such as the slice service 206 that manages slice files used as indirection layers for accessing data (e.g., key-value pairs) stored on the storage device 122 through the key value store 218, a block service 208 that manages block storage of the data (e.g., key-value pairs) in the storage devices 122, a transport service used to transport commands through a persistence abstraction layer 210 to the distributed storage backend 214, and/or other control plane services. The slice service 206 may be implemented as a metadata control plane and the block service 208 may be implemented as a data control plane. Because the storage management system 114 may be implemented as a distributed component, the slice service 206 and the block service 208 may communicate with one another on the first network storage appliance 108 and/or may communicate (e.g., through remote procedure calls) with other instances of the slice service 206 and the block service 208 hosted at other network storage appliances within the distributed storage environment 100.

In some embodiments of the slice service 206 utilize slices, such as slice files, as indirection layers to access key-value pairs stored within the key value store 218. The first network storage appliance 108 may provide the first application 104 and/or other applications with access to the volumes 204 through the data management system 110, which is backed by the key value store 218 stored within the storage devices 122. A volume may have N logical blocks that may be 1 kb each. If one of the logical blocks is in use and storing data, then the logical block has a block identifier of a block storing the actual data. A slice file for the volume has mappings that map logical block numbers of the volume to block identifiers of the blocks storing the actual data (key-value pairs of the key value store 218) in the storage devices 122. Each volume will have a slice file, so there may be hundreds of slices files that may be distributed amongst the network storage appliances within the distributed storage environment 100. A slice file may be replicated so that there is a primary slice file and one or more secondary slice files that are maintained as copies of the primary slice file. When key value commands (e.g., write operations and delete operations) are executed, corresponding mappings that are affected by these operations are updated within the primary slice file. The updates to the primary slice file are replicated to the one or more secondary slice files. After, the write or deletion operations are responded back to a client such as the first application 104 as successful. Also, read operations may be served from the primary slice since the primary slice may be the authoritative source of logical block to block identifier mappings.

In some embodiments, the control plane layer 121 may not directly communicate with the distributed storage backend 214, but may instead communicate through the persistence abstraction layer 210 using a persistent storage stack 212 hosted by the storage management system 214 for communication with a persistent storage stack 216 hosted by the distributed storage backend 214.

In some embodiments, the first application 104 may create a key value command, which may correspond to a read or write operation directed to a volume of the aggregate 112 backed by the key value store 218 of the distributed storage backend 214. The storage mapping functionality 106 may be used by the application layer 102 to determine that the key value command should be routed to the first network storage appliance 108 managing the aggregate 112 through which the volume is hosted. In this way, the data management system 110 of the first network storage appliance 108 receives the key value command from the first application 104, and routes the key value command to the storage management system 214. In some embodiments, a key value store interface hosted by the first network storage appliance 108 (e.g., hosted by the data management system 110, the storage management system 114, the distributed storage backend 214, or as the persistent storage stacks) may receive the key value command. As will be described in further detail below, the key value command may be translated by the key value store interface using a translation layer binding to create a key value operation. The key value operation is executed upon the key value store 218 of the distributed storage backend 214, such as through a storage stack 220 to store a key-value pair on the storage devices 122.

Figure 3:
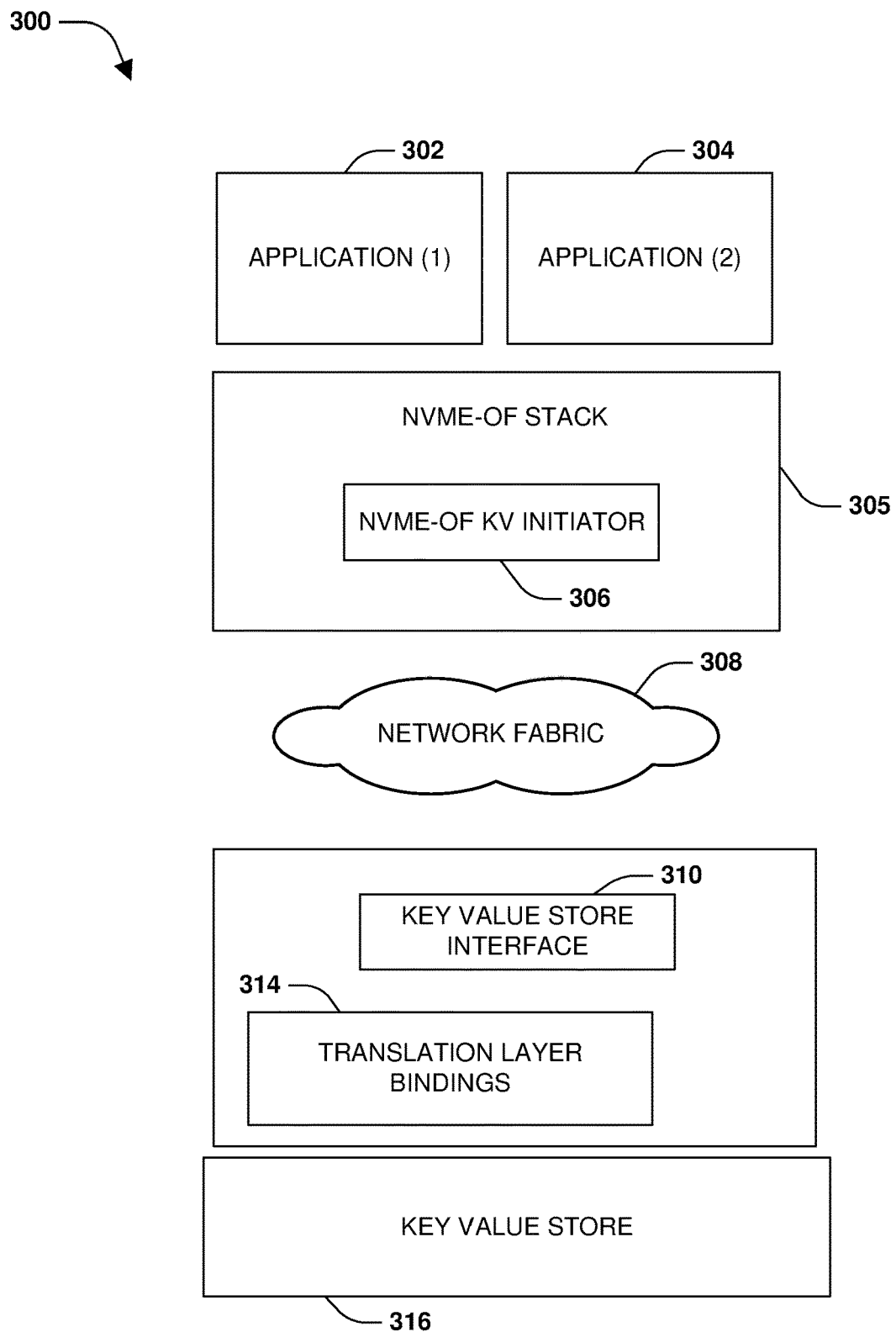
FIG. 3 is a block diagram illustrating an example of a network storage appliance implementing a non-volatile memory express over fabric (NVMe-oF) stack for providing access to a key value store in accordance with an embodiment of the technology.

In some embodiments, the persistent storage stack 212 and/or the persistent storage stack 216 may be implemented as non-volatile memory express over fabric (NVMe-oF) stacks, which is further described in relation to FIG. 3. In some embodiments, the slice service 260 and the block service 208 access the key value store 218 using NVMe-oF block and key value (KV) protocols.

FIG. 3 is a block diagram illustrating an example of a network storage appliance implementing an NVMe-oF stack 305 for providing access to a key value store 316 in accordance with an embodiment of the technology. Applications, such as a first application 302 and a second application 304, may generate key value commands, such as key value commands to store key-value pairs, retrieve key-value pairs, determine whether a key-value pair exists, delete a key-value pair, and/or list key-value pairs within the key value store 316. These applications may be provided with shared access over a network fabric 308 to the key value store 316 so that the applications may be hosted as stateless clients. These applications may utilize the key value commands to store variable sized data blobs and metadata into the key value store 316. Because the applications can utilize a key-value store interface 310 to access the key value store 316, the applications do not have to pack and unpack data according to fixed block sizes, but can store variable sized block (blobs) values within key-value pairs into the key value store 316 because the key-value store interface 310 supports the processing of variable sized data blobs. This reduces memory and processing resources that would otherwise be consumed by the applications with having to pack and unpack data according to fixed block sizes. The key-value store interface 310 provides key value store services in an aggregated manner across the multiple applications, which can amortize memory and processing resource consumption by the applications. Because the key-value store interface 310 supports variable sized block (blobs) of data and metadata that are stored as key-value pairs, the data and metadata of a particular key-value pair can be located using a key of the key-value pair without the overhead of traversing directory and metadata hierarchies.

An application may transmit a key value command to the NVMe-oF stack 305 integrated into a network storage appliance (e.g., network storage appliance 108). The key value command may be routed through network fabric 308 (e.g., NVMe/RoCEv2, TCP, etc.) to the key-value store interface 310. The key-value store interface 310 uses the translation layer bindings 314 to convert the key-value command into a key value operation according to semantics and a media specific API set of the key value store 316. The key value operation is then executed upon the key value store 316, such as by using an NVMe-oF namespace mapped to the key value store 316.

In order for a particular type of key value store/persistent storage media to interpret and process these operations, the translation layer binding is used to reformat key value commands from applications into key value operations formatted with the particular semantics (variables, functions, syntax, and parameters) that are supported and expected by the particular type of key value store/persistent storage media. In some embodiments, a translation layer binding is used to map the logical address of a key value pair to a location of the key value store in the underlying persistent storage. The translation layer binding may translation storage APIs used by application to submit key value commands into a particular storage interface (semantics supported by the storage interface) and APIs of a particular type of persistent storage media. In this way, the translation layer binding may provide a level of abstraction between the logical block addresses using by applications to access data and metadata (values) and the physical location of the key value pairs on the persistent storage. The existing block and file interfaces of conventional network storage appliances do not have these translation layer bindings because these interfaces merely provide block and file access to storage.

Figure 4:
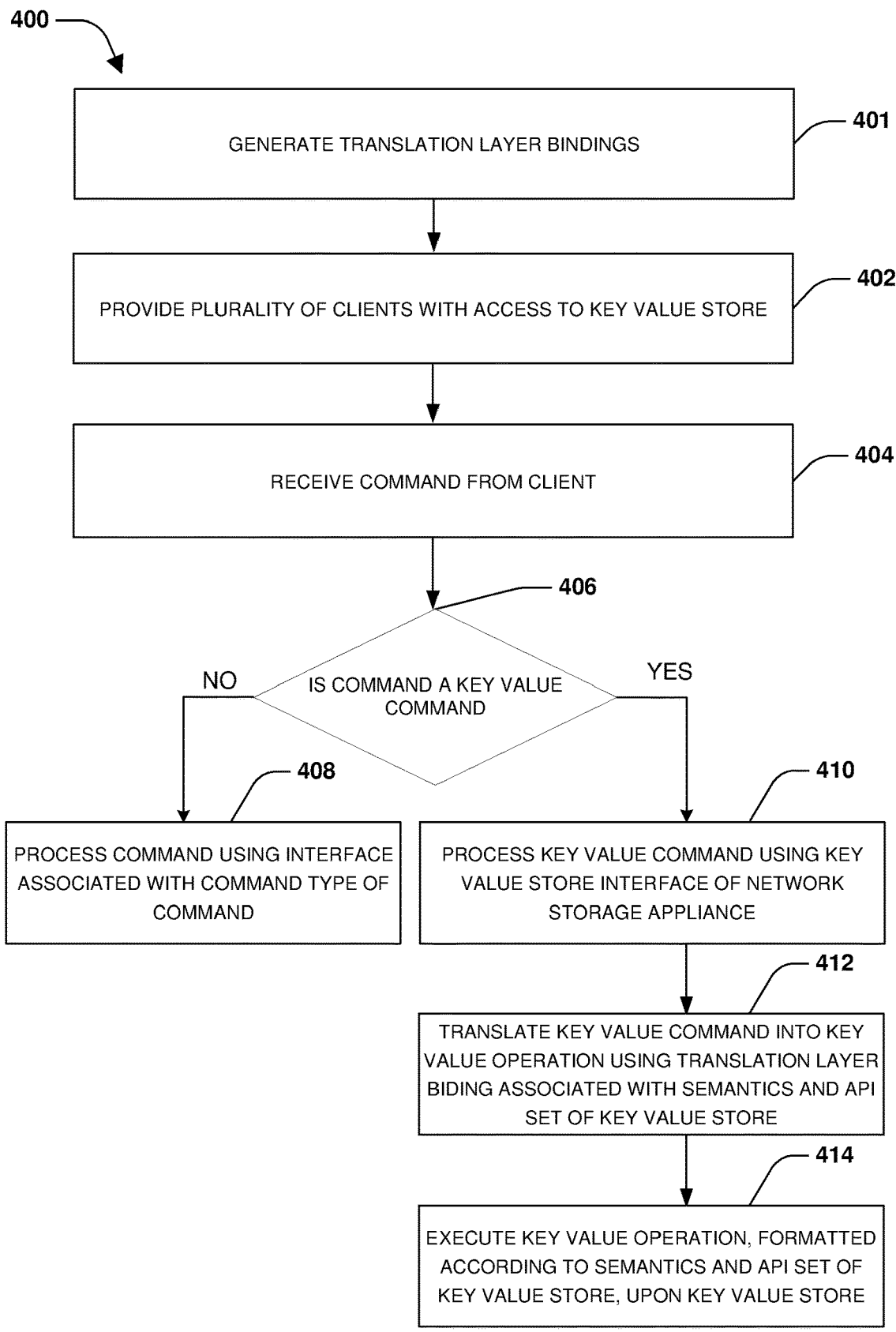
FIG. 4 is a flow chart illustrating an example of a set of operations that implement a key value store in accordance with various embodiments of the present technology.

FIG. 4 is a flow chart illustrating an example of a set of operations that implement a key value store in accordance with various embodiments of the present technology. This example is discussed in conjunction with FIG. 5A that shows a block diagram illustrating an example of implementing a key value store in accordance with an embodiment of the technology.

Figure 5A:
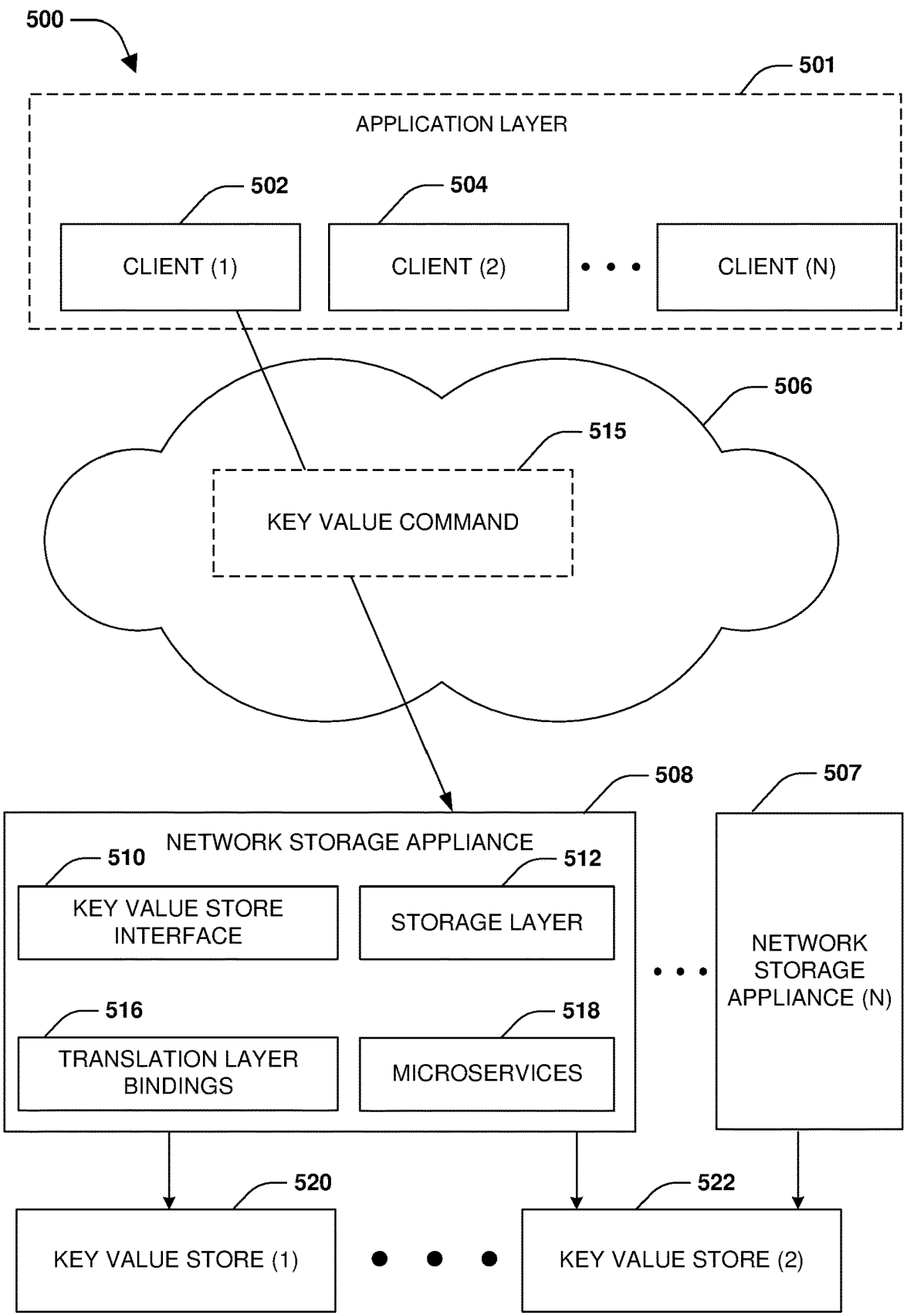
FIG. 5A is a block diagram illustrating an example of implementing a key value store in accordance with an embodiment of the technology.
Figure 5B:
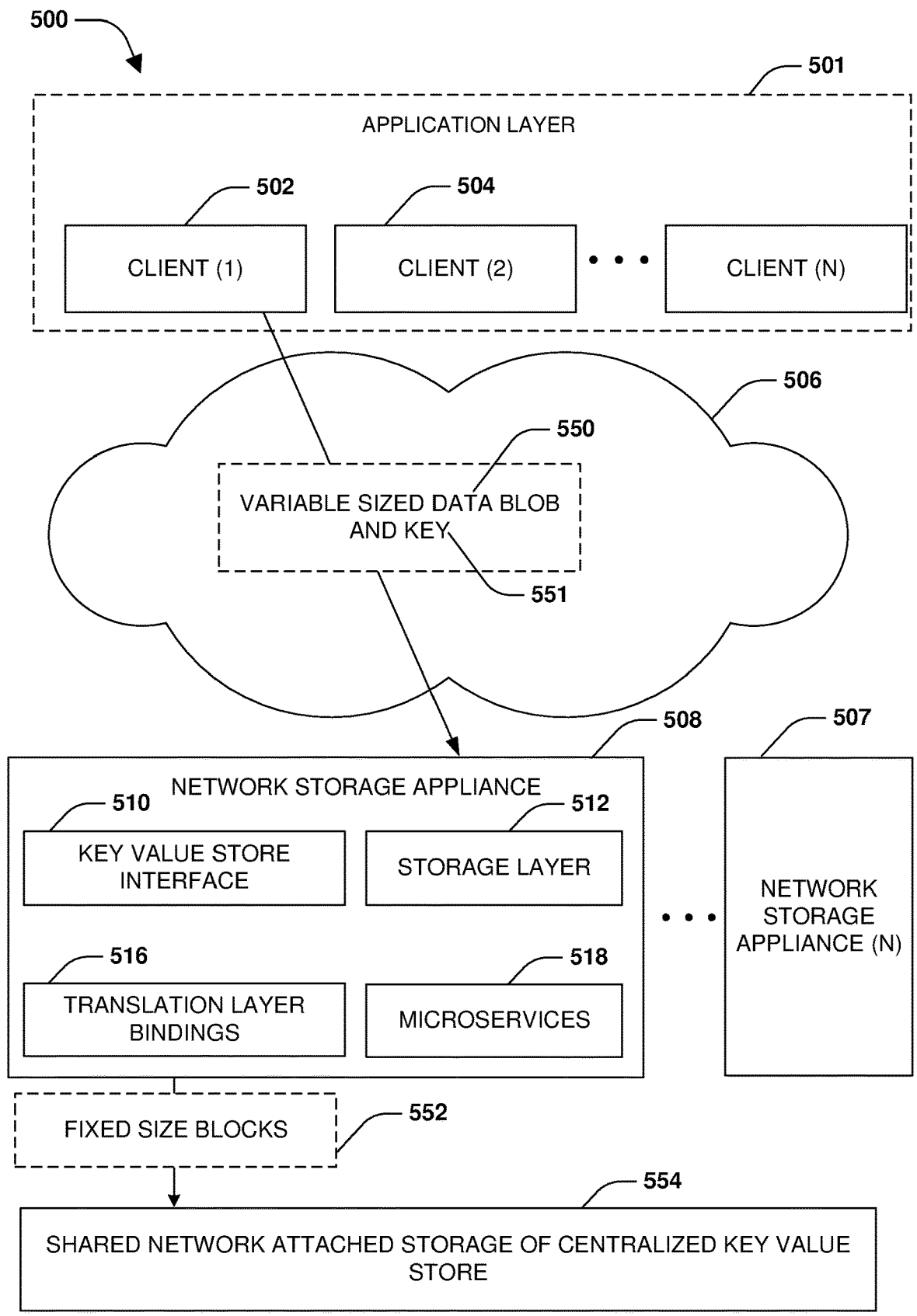
FIG. 5B is a block diagram illustrating an example of implementing a key value store in accordance with an embodiment of the technology.

In some embodiments, a network storage appliance 508 may be attached to a network fabric 506, as illustrated by FIGS. 5A and 5B. The network storage appliance 508 may comprise fabric attached storage, a node, a controller, hardware, software, a virtual machine, a container, or combination thereof. In some embodiments, the network storage appliance 508 is clustered with one or more other network storage appliances. The network storage appliance 508 is configured to provide access to and manage storage on behalf of clients, such as a first client 502, a second client 504, and/or any other number of clients that may be part of an application layer 501. In an embodiment, the network storage appliance 508 may comprise a block interface configured to provide the clients with block-based access to block storage, such as where the first client 502 can read and write according to fix block sizes such as 4 kb blocks. In another example, the network storage appliance 508 may comprise a file interface configured to provide the clients with file-based access to files. In another example, the network storage appliance 508 may comprise an object interface configured to provide object-based access to objects stored within an object store such as a cloud computing environment.

Accordingly, as provided herein, a key value store interface 510 is implemented by the network storage appliance 508 for providing multiple clients with shared access to a fabric attached key value store as disaggregated storage for storage of variable sized data, such as variable sized data blobs and metadata received from multiple clients. For example, the key value store interface 510 provides the first client 502, the second client 504, and/or other clients with the ability to store variable sized data blobs as value data items (e.g., an image, a file, a document, etc.) associated with keys (e.g., a hash of a corresponding value data item) used to access corresponding value data items. Because the key value store interface 510 can store the variable sized data blobs received by clients, the clients do not have to waste memory and processing resources to pack and unpack data according to fixed block sizes. Additionally, the key value store interface 510 provides clients with a simple and efficient technique for storage data and metadata of the variable sized data blobs without the overhead of a directory and metadata hierarchy otherwise by other types of storage systems such as network file systems (NFS).

In some embodiments, the key value store interface 510 may be integrated into a plurality of network storage appliances including the network storage appliance 508 as a cluster of network storage appliances. In this way, the cluster of network storage appliances may be configured to provide a plurality of clients with access to one or more key value stores. These key value stores may implement different API sets and/or may be hosted on different persistent storage backends (e.g., HDDs, SSDs, SCM storage, cloud storage, etc.). The cluster of network storage appliances may implement load balancing of client requests amongst the network storage applications to improve performance and efficiency. New network storage appliances may be dynamically added to the cluster of network storage appliances and/or network storage appliances may be dynamically removed from the cluster of network storage appliances based upon current demand in order to improve performance and/or reduce unnecessary resource consumption.

One or more persistent storage backends may host various types of key value stores. The one or more persistent storage backends may comprise HDDs, SSDs, SCM storage, cloud storage, or any other type of storage media (e.g., storage media used to host a RocksDB, a storage class memory (SCM) key value store, etc.). Each key value store may implement an API set tailored for the key value store and/or underlying persistent storage backend. A key value store may be centrally hosted within a persistent storage backend as disaggregated storage shared with the plurality of clients over the network fabric 506 by the one or more network storage appliances. In some embodiments, a first persistent storage backend may host a first key value store 520 implementing a first API set, a second persistent storage backend may host a second key value store 522 implementing a second API set, and/or any other number of persistent storage backends may host any number of key value stores implementing the same or different API sets.

The key value store interface 510 may perform a discovery process to discover the one or more persistent storage backends hosting the one or more key value stores. Each key value store may implement an API set and have a configuration defining attributes of the key value store. The key value store interface 510 may be configured to generate, through a configurable registration mechanism, mappings that map each key value store to a corresponding key value store namespace based upon key value store attributes of the key value store. In an embodiment, an attribute of the key value store corresponds to a configuration policy may be used to decide to host the key value namespace on an SCM backend for low latency access based upon the configuration policy specifying an attribute that latency is to be below a particular threshold. Similarly, if the attribute specifies a different latency, then the key value namespace may be hosted on a different type of storage backed (e.g., SSD for latency less than 1 ms; HDD for latency less than 10 ms; etc.). In an embodiment, the key value store may be mapped to a non-volatile memory express over fabric (NVMe-oF) namespace based upon the configuration. The key value store interface 510 may be configured to initialize the key value store based upon the attributes defined by the configuration and/or based upon an API discovery mechanism for discovering a media specific API set (e.g., an HDD API set, an SSD API set, an SCM API set, etc.), such as an API set of the key value store.

During operation 401 of method 400, a key value store interface 510 may generate translation layer bindings 516 for each key value store, such as a first translation layer binding for the first key value store 520, a second translation layer binding for the second key value store 522, etc. A translation layer binding for a key value store is configured to convert key value commands received from the clients over the network fabric 506 into key value operations. A key value operation may relate to a key value command that has been converted using a translation layer binding. Different key value stores may have different implementations in order to leverage media properties of the persistent backend storage. For example, a key value store for SCM may have simple API semantics, such as GET, PUT, LIST, and DELETE, and thus the implementation may be simple and optimized for low latency. A key value store for SSD may be more advanced with atomic commit of several keys, support for transactions, etc. A key value store for HDD may have longer latency. The key value operations may be formatted according to semantics and a media specific API set of the key value store and/or of the persistent storage backend storing the key value store. For example, a key value command 515 received from the first client 502 may comprise a key-value pair to store. The key-value pair may comprise a variable sized data blob as a data value item and a key such as a hash of the data value item. The network storage appliance 508 may select and utilize the first translation layer binding to translate/transform the key value command 515 into a key value operation formatted according to semantics and APIs implemented by the first key value store 520 based upon the key value command 515 targeting the first key value store 520. If the key value command 515 targets the second key value store 522, then the second translation layer binding may be selected and utilized to translate/transform the key value command 515 into a key value operation formatted according to semantics and APIs implemented by the second key value store 522.

The key value store interface 510 may implement a non-volatile memory express over fabric (NVMe-oF) stack (e.g., persistent storage stack 212 and/or persistent storage stack 216 of FIG. 2). The key value store interface 510 may utilize the NVMe-oF stack to process commands from clients for access to the key value store such as the key value command 515. The key value store interface 510 may utilize the NVMe-oF stack to persistently store values (data value items) based upon keys associated with the values (e.g., hashes of the data value items). The NVMe-oF stack may comprise a storage performance development kit (SPDK) infrastructure with a set of libraries such as a reactor model library, an events library, a proto library, a poll mode library, an asynchronous library, a user space library, etc. The NVMe-oF stack is used to receive key value commands that are received over NVMe-oF from clients that utilized a key value initiator to generate the key value commands, such as by using the SPDK infrastructure. Thus, the key value store interface 510 can use the NVMe-oF stack in order to process the key value commands using the SPDK infrastructure hosted at the network storage appliance 508.

During operation 402 of method 400 of FIG. 4, the network storage appliance 508 and/or other network storage appliances, connected to the clients over the network fabric 506, provide the clients with access to one or more key value stores. For example, the network storage appliance 508 orchestrates the discovery of key value namespaces dynamically by the clients. These key value namespaces (e.g., NVMe-oF namespaces) were mapped by the network storage appliance 508, using the configurable registration mechanism, to the key value stores based upon attributes specified through configurations of the key value stores. These configurations may dynamically change during operation, and thus the network storage appliance 508 may update any corresponding translation layer bindings 516 as necessary based upon the updates to the configurations. Once a client connects to the network storage appliance 508 (e.g., connecting to an NVMe controller at a specified IP address), the client may discover key value stores that are associated with the key value store namespaces. This discovery process may leverage NVMe-oF specified methods. The client may store key value attributes of the discovered key value namespaces, and may generate and transmit key value operations over the fabric network (e.g., over an NVMe-oF network), such as to store a key-value pair or retrieve a value data item using a key. The client may package key value commands into NVMe-oF commands, which are transmitted to the network storage appliance 508.

In some embodiments of the NVMe-oF commands, an NVME list command may be implemented to list NVMe storage devices (e.g., SSDs), such as names, serial numbers, sizes, logical block address (LBA) format, and/or other information. An NVMe identifier control command may be implemented to discover information about an NVMe controller and features supported by the NVMe controller. An NVMe identifier namespace command may be implemented to discover features of an NVMe namespace, optimizations, features, and support for an NVMe controller. An NVMe format command may be implemented to erase data on a storage device (e.g., delete a key-value pair of a key value store), format a logical block address size for the storage device, or create protection information for end to end data protection. An NVMe sanitize command may be implemented to erase all data on a storage device, such as all key-value pairs of a key value store. An NVMe command to write, read, or delete a key-value pair from the key value store. An NVMe command to output a log page for health status, temperature, endurance, and/or other information. An NVMe firmware log command to output a firmware log page of a storage device. An NVMe error log command to output an NVMe error log page. An NMVe reset command to reset an NVMe controller and/or storage device. An NVMe delete namespace command to delete a namespace. An NVMe create namespace command to create a namespace, such as to create a smaller size namespace to overprovision a storage device to improve endurance, performance, and/or latency.

During operation 404 of method 400 of FIG. 4, the network storage appliance 508 receives a command from a client. In some embodiments, the network storage appliance 508 may receive and demultiplex the command to a specified device associated with a key value store targeted by the command (e.g., a persistent storage backend device of the key value store targeted by the command). During operation 406 of method 400 of FIG. 4, the network storage appliance 508 may determine whether the command is a key value command (e.g., a key value command packaged into an NVMe-oF command).

If the command is not a key value command, then the command may relate to a different type of command, such as a file access command, a block access command, an object access command, etc. Accordingly, during operation 408 of method 400 of FIG. 4, the command is processed using an interface (e.g., a file interface, a block interface, an object interface, etc.) of the network storage appliance 508 that corresponds to a command type of the command.

If the command is a key value command, then the key value command is processed using the key value store interface 510 of the network storage appliance 508, during operation 410 of method 400 of FIG. 4. In some embodiments, the key value command comprises a variable sized data blob (e.g., a file, an image, a document, database data, etc.) and a key, such as a hash of the variable sized data blob. In some embodiments, the key value command may be formatted by the client according to key value store semantics corresponding to the key value attributes of a discovered key value namespace of the key value store. The key value store semantics may have been used by the network storage appliance 508 to expose the key value store to clients as variable sized storage units for storing variable sized data blob and variable sized metadata. The key value store semantics may provide the clients with direct non-hierarchical access to variable sized data blobs and variable sized metadata identifiable using corresponding keys. In this way, a client may store metadata and data identifiable using keys within a key value store without the overhead of maintaining and using a directory and metadata hierarchy used by other types of network file systems.

The key value store interface 510 may parse the key value command to identify a translation layer binding associated with the key value store targeted by the key value command. The key value command may be translated using the translation layer binding into a key value operation, during operation 412 of method 400. For example, the translation laying binding may be used to reformat the key value command into a format that can be processed using semantics and specific APIs of an API set of the key value store (e.g., different key value stores may use different API sets) and are tailored to a type of access provided by a persistent storage backend storing the key value store (e.g., tailored for read/write access to an HDD, an SSD, SCM storage, cloud storage, etc.). Accordingly, the key value operation, formatted for the specific APIs of the key value store and the type of persistent storage backend storing the key value store, may be executed upon the key value store, during operation 414 of method 400.

In some embodiments of executing the key value operation, the key value store interface 510 may utilize the translation layer binding to pack a variable size data blob and key in the key value command into fixed sized blocks used by the persistent storage backend (e.g., a storage device of shared network attached storage for which the key value store is exposed to clients for access) to physically store data. In some embodiments, additional information may be appended to the variable sized data block before being packed into the fixed size blocks, such as erasure coding information used by RAID. In this way, the key value store interface 510 may store the fixed sized blocks into the persistent storage backend hosting the key value store.

In some embodiments, a network storage appliance may receive a request from a client to access the variable sized data blob. The request may comprise the key associated with the variable sized data blob (e.g., the variable sized data blob and the key may be part of a key-value pair). A key value store interface of the network storage appliance may use the key to identify the variable sized data blob within the key value store, such as by identifying the fixed size blocks in the persistent storage backend storing the variable sized data blob. The key value storage interface may be used to retrieve the fixed sized blocks from the persistent storage backend, and use the fixed sized blocks to reconstruct the variable sized data blob. In this way, the network storage appliance transmits the variable sized data blob to the client.

Because the key value store is exposed by any number of network storage appliances to clients for shared access (e.g., the network storage appliance 508 through network storage appliance (N) 507), the client may be the same client that sent the key value command to store the variable sized data blob or a different client. Similarly, the network storage appliance that receives and processes the request may be the same network storage appliance that processed the key value command or a different network storage appliance. This allows for stateless clients, nodes, and/or network storage appliances. For example, a distributed file system accessible through a plurality of network storage appliances (nodes) hosted as stateless containers may be implemented such that a plurality of clients are provided with access through the distributed file system for storing variable sized data blobs associated with keys. Access to the key value store may be scaled out by adding additional network storage appliances on-demand on an as needed basis. Similarly, additional persistent storage backends, such as disaggregated scale-out network attached storage, may be added to increase storage for the key value store on-demand on an as needed basis.

In some embodiments, the network storage appliance 508 may implement a storage layer 512 associated with the key value store interface 510. Functionality of an application layer (e.g., application layer 102 of FIG. 1) associated with a client and/or the network storage appliance 508 may be offloaded to the storage layer 512. For example, microservice management can be offloaded from applications to the storage layer 512. In this way, the storage layer 512 may manage microservices 518 that are configured to perform various storage functionality for key value stores, such as compression, deduplication, etc.

FIG. 5B is a block diagram illustrating an example of implementing a key value store in accordance with an embodiment of the technology. In some embodiments, the key value store interface 510 of the network storage appliance 508 may provide the first client 502, the second client 504, and/or other clients with access over the network 506 to a centralized key value storage as shared network attached storage 554 according to key value storage semantics. The key value store interface 510 may receive a variable sized data blob 550 and a key 551 associated with the variable sized data block 550 from the client 502. The variable sized data blob 550 may comprise any type and size of data, such as a music file, a video, text, an image, data to store within a database entry, etc. The key 551 may be a unique identifier for the variable sized data blob 550, such as a hash generated by a hashing function that generates the hash as a function of the content within the variable sized data blob 550.

The key value store interface 510 packs the variable sized data blob 550 and the key 551 into fixed sized blocks 552 (e.g., 4 kb blocks). The variable sized data blob 550 and the key 551 are packed into fixed sized blocks 552 because storage devices of the shared network attached storage 554 may be block storage device that store data according to fixed size blocks. In this way, the key value store interface 510 stores the fixed size blocks 552 into the shared network attached storage 554 of the centralized key value store.

Figure 6:
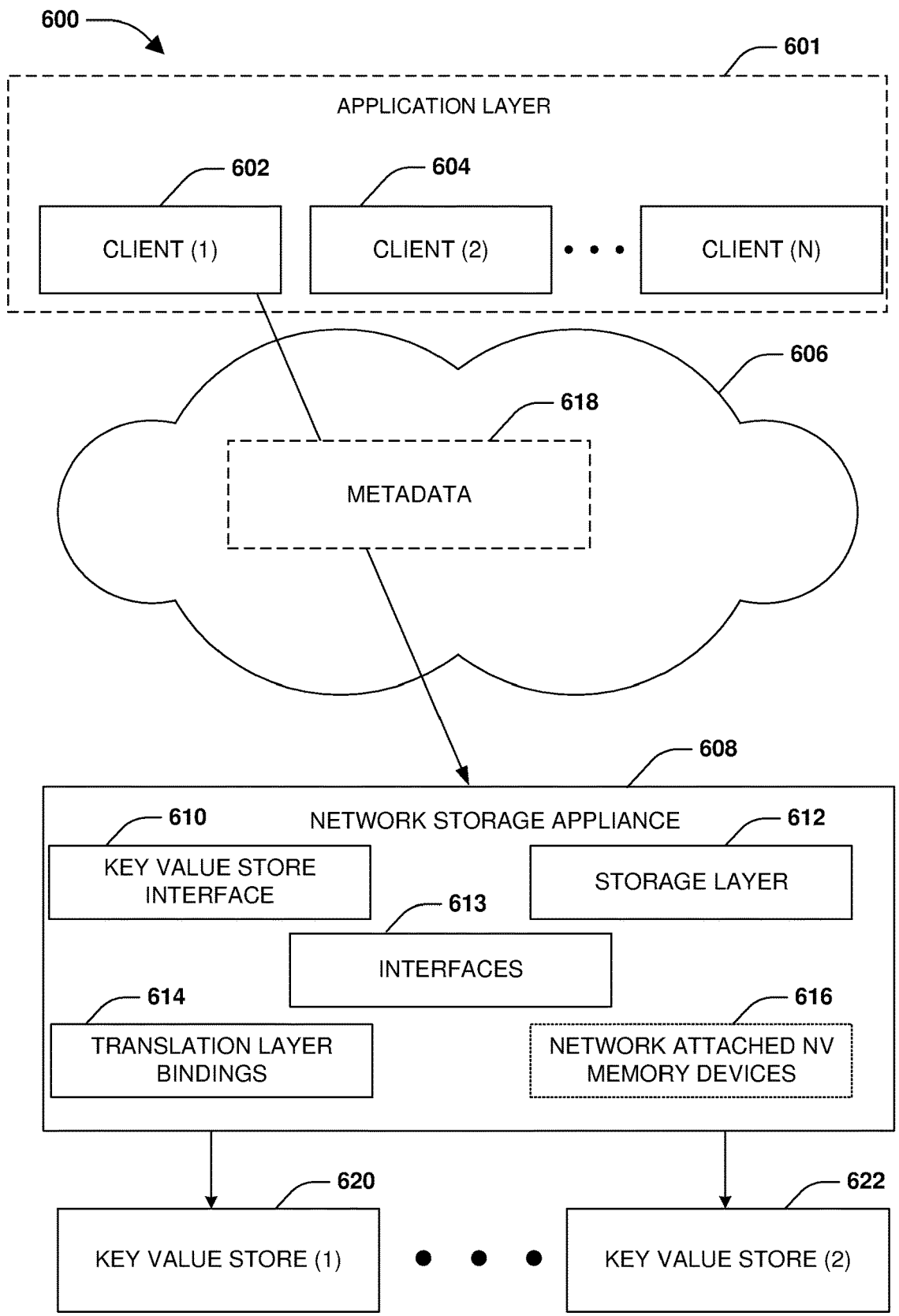
FIG. 6 is a block diagram illustrating an example of implementing a key value store used as network attached nonvolatile memory devices in accordance with various embodiments of the present technology.

FIG. 6 is a block diagram illustrating an example of implementing a key value store used as network attached nonvolatile memory devices in accordance with various embodiments of the present technology. In particular, the system 600 comprises one or more network storage appliances configured to provide clients with access to fabric attached non-volatile memory devices 616 for offloading metadata of applications hosted by the clients in order to reduce memory consumption and provide efficient metadata lookups. In some embodiments, a network storage appliance 608 is connected, over a network fabric 606, to a first client 602, a second client 604, and/or over clients hosted by an application layer 601. The network storage appliance 608 may comprise a key value store interface 610 configured to discovery key value stores hosted by persistent storage backends, such as a first key value store 620 hosted on a first persistent storage backend, a second key value store 622 hosted on a second persistent storage backend, etc. In some embodiments, the fabric attached non-volatile memory devices 616 may be backed by the key value stores hosted by the persistent storage backends. That is, the data of the fabric attached non-volatile memory devices 616 may be stored as key-value pairs in the key value stores. The key value store interface 610 may be configured to generate translation layer bindings 614 configured to convert key value commands from the clients into key value operations formatted according to semantics and API sets of particular key value stores. The network storage appliance 608 may provide clients with disaggregated and shared access to the key value stores using the key value store interface 610. The network storage appliance 608 may comprise a storage layer 612 used to implement functionality offloaded from an application layer, such as the management of microservices configured to provide storage functionality.

The network storage appliance 608 may implemented other interfaces 613 such as a block interface configured to provide block-based access to block storage, a file interface configured to provide file based access to files, or an object interface configured to provide object based access to objects within an object store.

In some embodiments, the network storage appliance 608 may utilize a persistent storage backend as physical storage for the fabric attached non-volatile memory devices 616. The network storage appliance 608 may provide the clients with shared access to the fabric attached non-volatile memory devices 616. For example, the first client 602 and the second client 604 may be provided with access to the same fabric attached non-volatile memory device. This enables applications on the clients to offload metadata, which can be shared amongst the clients. For example, the first client 602 may offload metadata 618 to the network storage appliance 608 for storage within a fabric attached non-volatile memory device. The network storage appliance 608 may provide the clients with shared access to the fabric attached non-volatile memory device so that the first client 602 and/or other clients can access the offloaded metadata 618 within the fabric attached non-volatile memory device 616. This reduces a memory cost (e.g., a DRAM tax) of applications and/or reduces an overall cost to deploy applications since the applications can offload metadata to the fabric attached non-volatile memory devices 616 managed by the network storage appliance 608. That is, the applications do not need to consume compute and storage resources for maintaining and the metadata, which is otherwise offloaded from the applications to the fabric attached non-volatile memory devices 616 for management by the network storage appliance 608.

Figure 7A:
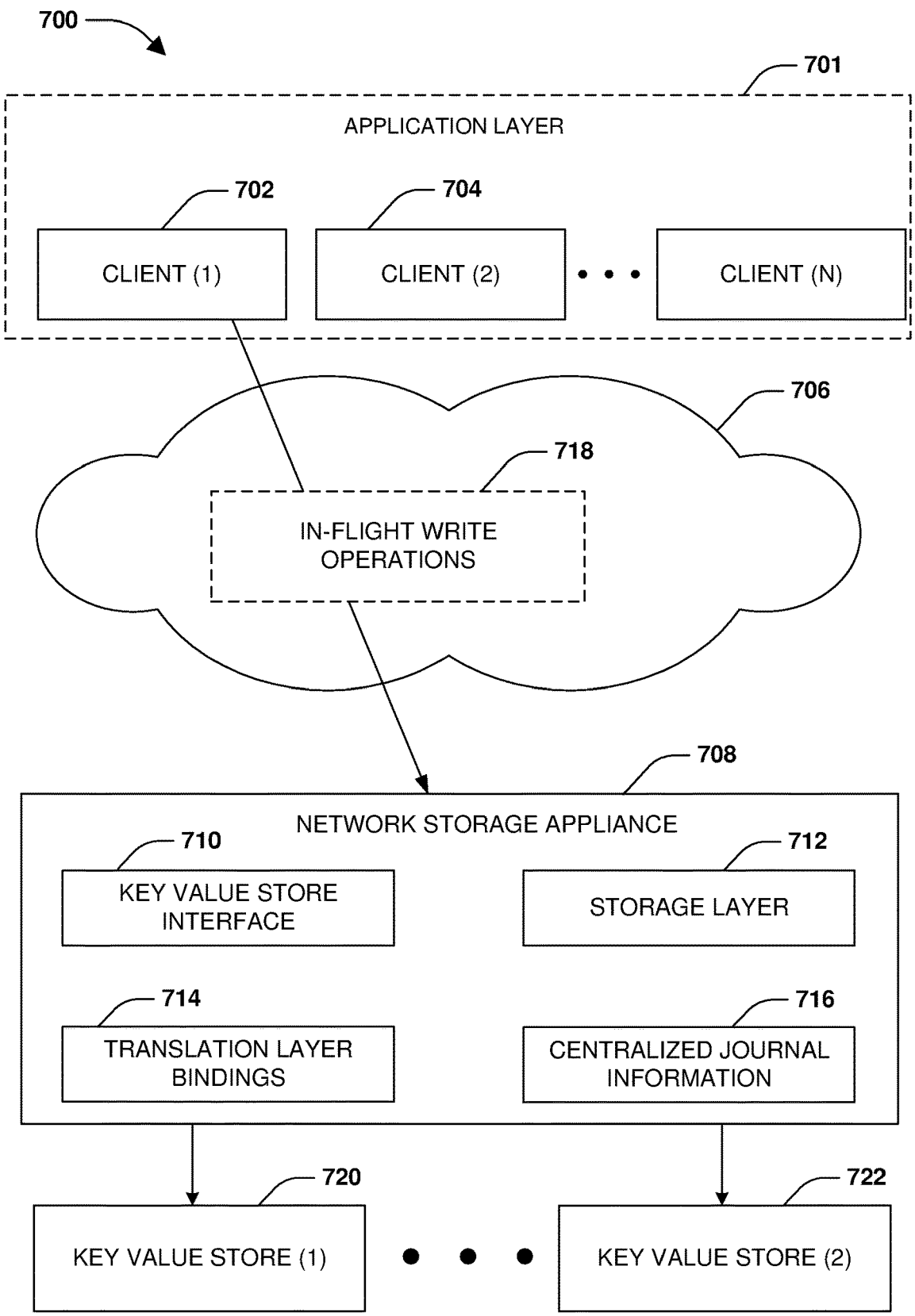
FIG. 7A is a block diagram illustrating an example of implementing a key value store used for logging in-flight write operations in accordance with various embodiments of the present technology.
Figure 7B:
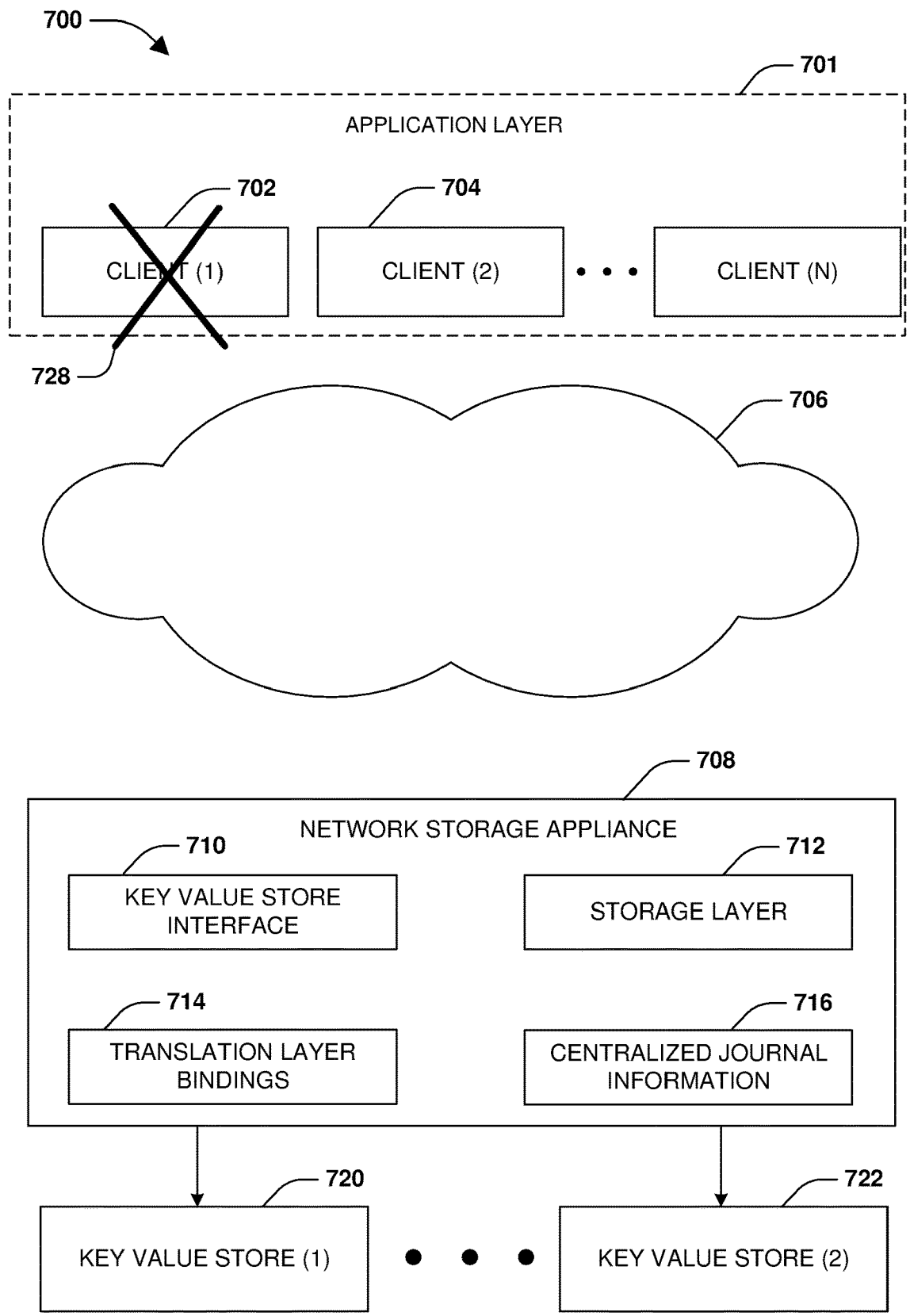
FIG. 7B is a block diagram illustrating an example of maintaining a key value store during a failure of a first client in accordance with various embodiments of the present technology.
Figure 7C:
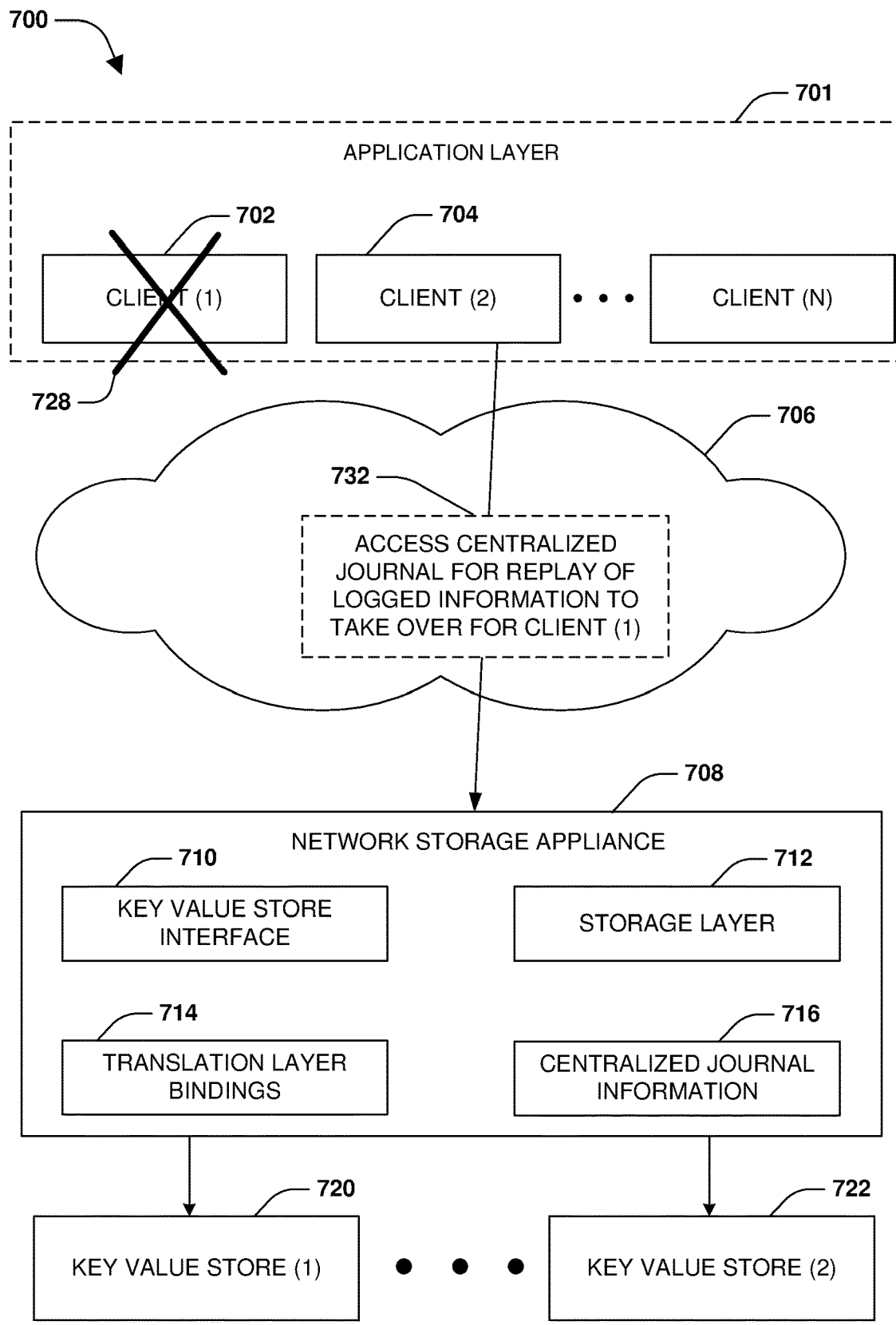
FIG. 7C is a block diagram illustrating an example of providing a second client with failover access to a key value store during failure of a first client in accordance with various embodiments of the present technology.

FIGS. 7A-7C are block diagrams illustrating an examples of interactions with a key value store under different conditions (e.g., implementing a key value store used for logging in-flight write operations, maintaining a key value store during a failure of a first client, and providing a second client with failover access to a key value store during failure) in accordance with various embodiments. In some embodiments, a network storage appliance 708 is connected, over a network fabric 706, to a first client 702, a second client 704, and/or other clients within an application layer 701, as illustrated by FIG. 7A depicting an example of implementing a key value store used for logging in-flight write operations in accordance with various embodiments of the present technology. The network storage appliance 708 may comprise a key value store interface 710 configured to discover key value stores hosted by persistent storage backends, such as a first key value store 720 hosted on a first persistent storage backend, a second key value store 722 hosted on a second persistent storage backend, etc. In some embodiments, the centralized journal may be backed by the key value stores (e.g., journal entries may be stored as key—value pairs within the key value stores) hosted by the persistent storage backends, and is tracked and managed using centralized journal information 716. The key value store interface 710 may be configured to generate translation layer bindings 714 configured to convert key value commands from the clients into key value operations formatted according to semantics and API sets of particular key value stores. The network storage appliance 708 may provide clients with disaggregated and shared access to the key value stores using the key value store interface 710. The network storage appliance 708 may comprise a storage layer 712 used to implement functionality offloaded from an application layer, such as the management of microservices configured to provide storage functionality.

In some embodiments, the network storage appliance 708 may utilize a persistent storage backend (e.g., network attached persistent memory for a distributed file system implemented through a key value store) to physically store the centralized journal using the key value store interface 710. The network storage appliance 708 may manage the centralized journal using the centralized journal information 716. The network storage appliance 708 may allow clients, such as nodes, to log information into the centralized journal. For example, the first client 702 may log in-flight write operations 718 (e.g., write operations not yet committed to persistent storage of the first client 702; write operations not yet committed to persistent storage of the first client 702 and replicated to and committed by a partner client/node to persistent storage; etc.) into the centralized journal. The network storage appliance 708 may allow the first client 702 and/or other clients (nodes) to access the information logged within the centralized journal, such as where the second client 704 may read the in-flight write operations 718 logged within the centralized journal. In some embodiments, the centralized journal may be implemented as a non-volatile memory log, such as an NVRAM log. For example, the key value store interface 710 may maintain a non-volatile memory log within shared network attached storage such that a node hosted through a stateless container is configured to log in-flight write operations into the non-volatile memory log.

The centralized journal, such as the non-volatile memory log, may be used for failover scenarios between clients (nodes). For example, the first client 702 and the second client 704 may be partners such that if one client fails, then the other client will take over the processing for the failed client. As part of failover, the surviving client will need to replay any in-flight write operations (e.g., write operations not yet committed by both the failed client and the surviving client before the failure) in order to provide applications with access to the most up-to-date data instead of stale data. For example, the first client 702 may fail 728, as illustrated by FIG. 7B depicting an example of maintaining a key value store during a failure of the first client 702 in accordance with various embodiments of the present technology. Failure of the first client 702 may be detected through various mechanism, such as detection of a loss of heartbeat. In response to the first client 702 failing 728, the second client 704 may initiate a failover in order to takeover processing otherwise provided by the first client 702 before the failure 728, as illustrated by FIG. 7C depicting an example of providing the second client 704 with failover access to a key value store during failure of the first client 702 in accordance with various embodiments of the present technology. As part of the failover, the second client 704 may access 732 the centralized journal, such as the non-volatile memory log, through the network storage appliance 708 in order to replay any logged in-flight write operations within the centralized journal (e.g., the logged in-flight write operations may be logged as journal entries stored as key-value pairs within key value stores). In this way, the second client 704 will have access to up-to-date data in order to takeover for the failed first client 702. In some embodiments where the second client 704 is not an active partner of the first client 702, a new client 730 may be created and hosted through a stateless container in order to perform a failover for the failed first client 702 in response to the first client 702 failing 728. In this way, the network storage appliance 708 may implement a centralized journal that is shared amongst clients/nodes for logging in-flight write operations used for failover purposes.

Figure 8:
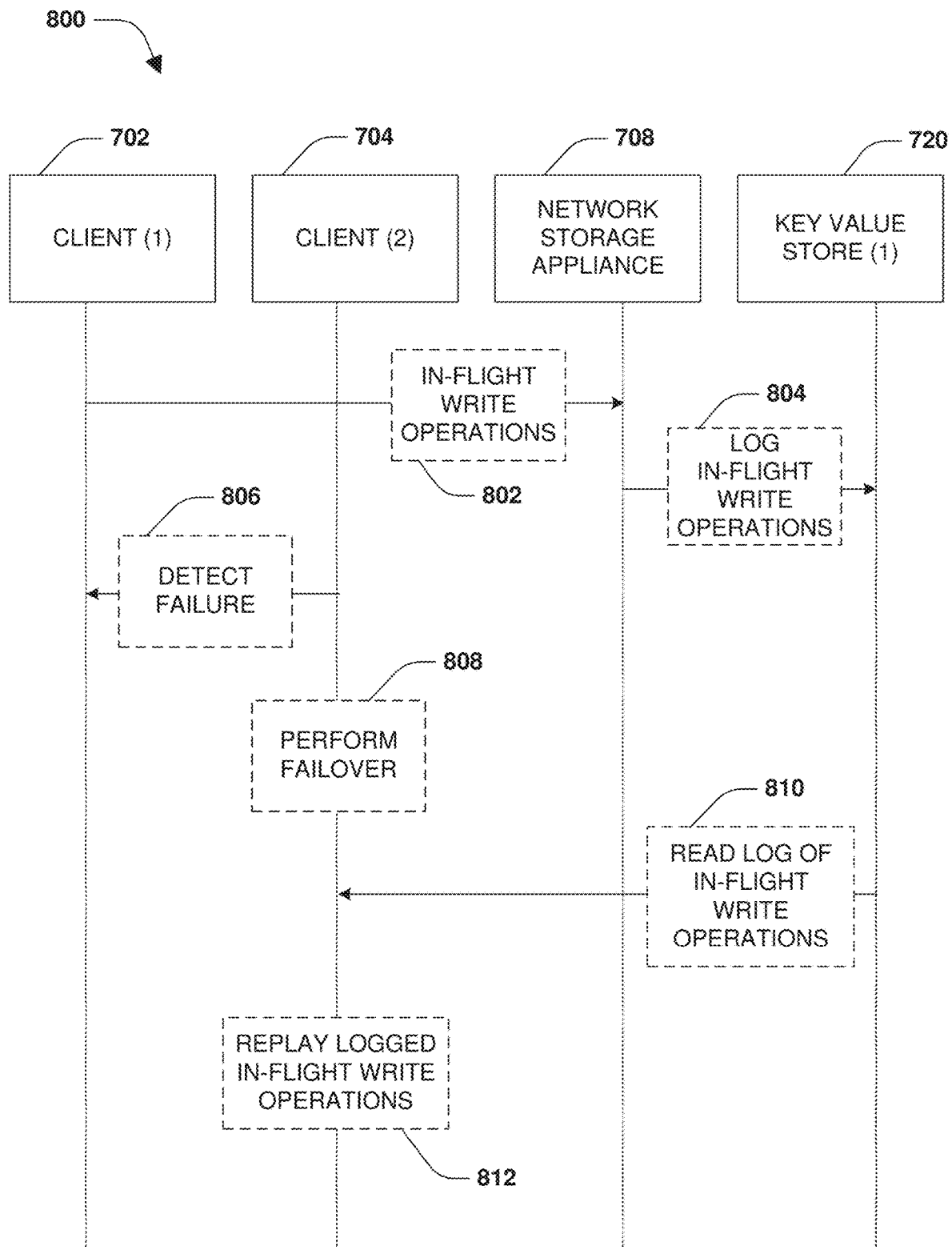
FIG. 8 is a sequence diagram illustrating clients performing a failover in accordance with various embodiments of the present technology.

FIG. 8 is a sequence diagram 800 illustrating clients performing a failover in accordance with various embodiments of the present technology. The sequence diagram 800 describes interactions between the first client 702, the second client 704, the network storage appliance 708, and the centralized journal of the key value store 720 in relation to FIGS. 7A-7C. The first client 702 transmits 802 the in-flight write operation 802 to the network storage appliance 708 so that the in-flight write operations 802 can be logged into the centralized journal. The network storage application 708 logs 804 the in-flight write operations 802 into the centralized journal by writing the in-flight write operations 802 to the key value store 720. This provides the first client 702 with the ability to offload the loading of in-flight write operations to the network storage appliance.

During operation of the first client 702, the second client 704 may track the health of the first client 702 such as through a heartbeat mechanism in order to determine whether the first client 702 is operational or have failed. The second client 704 may detect 806 a failure of the first client 720. In response to detecting the failure, the second client 704 may implement 808 a failover in order to take over for the failed first node 702. Before taking over the processing of client I/O operations on behalf of the failed first node 702, the second client 704 will need access to the latest data, such as the in-flight write operations logged within the centralized journal. Accordingly, the second client 704 reads 810 the in-flight write operations from the log, such as by invoking the network storage appliance 708 to read such data from the key value store 720. The second client 704 replays 812 the in-flight write operations so that the second client 704 has access to the latest data. After, the second client 704 can service client I/O operations.

Figure 9:
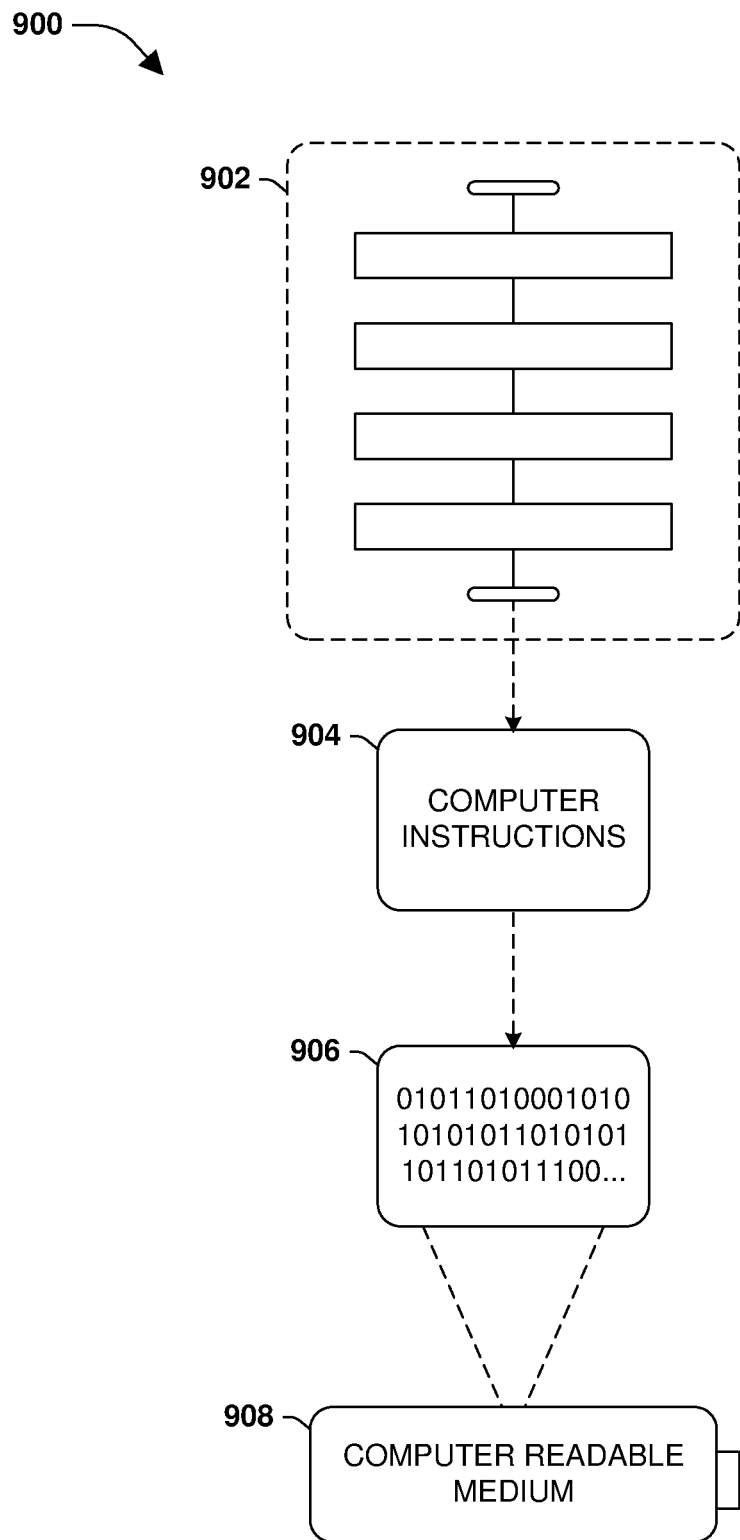
FIG. 9 is an example of a computer readable medium in which various embodiments of the present technology may be implemented.

FIG. 9 is an example of a computer readable medium in which various embodiments of the present technology may be implemented. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform a method 902, such as at least some of the exemplary method 400 of FIG. 4, for example. In some embodiments, the processor-executable computer instructions 904 are configured to implement a system, such as at least some of the exemplary system 500 of FIG. 5, at least some of the exemplary system 600 of FIG. 6, and/or at least some of the exemplary system 700 of FIGS. 7A-7C, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:

a persistent storage backend centrally hosting a key value store as disaggregated storage shared with a plurality of clients over a network fabric; and a network storage appliance, connected to the plurality of clients over the network fabric, configured with a key value store interface configured to:

receive a key value command from a client over the network fabric, wherein the key value command comprises a variable sized data blob, and wherein the key value store interface provides variable sized access to the key value store by supporting key value commands formatted according to a format that supports variable sized data blobs having differing sizes;

parse the key value command to identify a translation layer binding associated with the key value store targeted by the key value command;

translate, using the translation layer binding, the key value command, from the format that supports the variable sized data blobs, into a key value operation according to key value store semantics; and execute the key value operation upon the key value store.

2. The system of claim 1, wherein the network storage appliance is configured with at least one of a block interface configured to provide block based access to block storage, a file interface configured to provide file based access to files, or an object interface configured to provide object based access to objects within an object store.

3. The system of claim 1, wherein the key value store interface is configured to implement a non-volatile memory express over fabric (NVMe-oF) stack to process commands from the plurality of clients for access to the key value store and to persistently store values based upon keys associated with the values.

4. The system of claim 1, further comprising a plurality of network storage appliances configured as a cluster to provide the plurality of clients with access to the key value store.

5. The system of claim 1, wherein the key value store interface is configured to:

discover a plurality of persistent storage backends hosting a plurality of key value stores implementing different API sets; and generate translation layer bindings for each key value store of the plurality of key value stores, wherein the translation layer binding for the key value store is configured to convert key value commands received over the network fabric to key value operations according to semantics and a media specific API set of the key value store and the persistent storage backend storing the key value store.

6. The system of claim 1, wherein the key value store interface is configured to generate, through a configurable registration mechanism, mappings that map key value stores to key value store namespaces based upon key value store attributes of the key value stores.

7. The system of claim 1, wherein the key value store interface is configured to initialize the key value store based upon a configuration defining attributes of the key value store and defining an API discovery mechanism for discovering a media specific API set of the key value store.

8. The system of claim 7, wherein the key value store interface is configured to generate and bind, based upon the configuration, the translation layer binding to the key value store and the media specific API set of the key value store used to service key value operations.

9. The system of claim 7, wherein the key value store interface is configured to associate a non-volatile memory express over fabric (NVMe-oF) namespace with the key value store based upon the configuration.

10. A method comprising:

providing, by a key value store interface hosted by a network storage appliance, a plurality of clients with access over a network to a centralized key value store as shared network attached storage according to key value store semantics;

receiving, by the key value store interface, key value commands comprising variable sized data blobs and hashes of the variable sized data blobs, wherein the key value store interface provides variable sized access to the centralized key value store by supporting the key value commands formatted according to a format that supports the variable sized data blobs having differing sizes;

translating, using a translation layer binding, the key value commands, from the format that supports the variable sized data blobs, into key value operations according to the key value store semantics; and storing, by the key value store interface using the key value operations, the variable sized data blobs as values and the hashes as keys into the centralized key value store.

11. The method of claim 10, comprising maintaining a distributed file system accessible through a plurality of nodes hosted as stateless containers, wherein the distributed file system is used to provide access to the variable sized data blobs and keys stored within the centralized key value store.

12. The method of claim 10, comprising scaling out the centralized key value store with additional disaggregated scale-out persistent network attached storage for the centralized key value store.

13. The method of claim 10, wherein the key value store semantics expose the centralized key value store to the plurality of clients as variable sized storage units for storing the variable sized data blobs and variable sized metadata.

14. The method of claim 10, wherein the key value store semantics expose the centralized key value store to the plurality of clients for direct non-hierarchical access to variable sized metadata and the variable sized data blobs identifiable using the keys.

15. The method of claim 10, comprising maintaining, by the key value store interface, a centralized journal within network attached persistent memory for a distributed file system implemented through the centralized key value store, wherein a node is configured to log information into the centralized journal.

16. The method of claim 15, comprising providing a plurality of nodes with access to the information logged into the centralized journal by the node.

17. The method of claim 15, wherein in-flight write operations being processed by the node are logged as the information within the centralized journal.

18. The method of claim 15, wherein shared access to the centralized journal, implemented as a non-volatile memory log, is provided to a plurality of nodes.

19. The method of claim 10, comprising maintaining, by the key value store interface, a non-volatile memory log within the shared network attached storage, wherein a first node hosted through a first stateless container is configured to log in-flight write operations into the non-volatile memory log.

20. The method of claim 19, comprising in response to the first node failing, creating a second node hosted through a second stateless container to perform a failover to take over for the first node, wherein the second node is provided access the non-volatile memory log for replaying the in-flight write operations logged into the non-volatile memory log by the first node.

21. The method of claim 10, comprising providing the plurality of clients with access to network attached non-volatile memory devices for offloading metadata of applications to the network attached non-volatile memory devices.

22. A non-transitory machine readable medium comprising instructions, which when executed by a machine, causes the machine to:

host a network storage appliance as a stateless container connected over a network to a centralized key value store as shared network attached storage accessible to the network storage appliance and a plurality of other network storage appliances according to key value store semantics;

format, by the network storage appliance using a key value store interface used to access the centralized key value store, a key value command into a key value operation according the key value store semantics, wherein the key value command comprises a variable sized data blob and a key, and wherein the key value store interface provides variable sized access to the centralized key value store by supporting key value commands formatted according to a format that supports variable sized data blobs having differing sizes; and receive, by the network storage appliance from the key value store interface, an acknowledgement that the variable sized data blob and key were stored within the centralized key value store.

23. The non-transitory machine readable medium of claim 22, wherein the instructions further cause the machine to offload, by the network storage appliance through the key value store interface, in-flight write operations into a non-volatile memory log of the shared network attached storage for access by the network storage appliance and the plurality of other network storage appliances.

24. The non-transitory machine readable medium of claim 22, wherein the instructions further cause the machine to offload, by the network storage appliance through the key value store interface, metadata to network attached non-volatile memory of the shared network attached storage for access by the network storage appliance and the plurality of other network storage appliances.

25. The non-transitory machine readable medium of claim 22, wherein the instructions further cause the machine to host, through a storage layer associated with the key value store interface, one or more microservices configured to provide storage functionality for the centralized key value store.

26. The non-transitory machine readable medium of claim 24, wherein the functionality is offloaded from an application layer associated with the network storage appliance to the storage layer hosted within a computing environment associated with the centralized key value store.

27. The non-transitory machine readable medium of claim 22, wherein the instructions further cause the machine to append, by the network storage appliance, erasure codding information to the variable size data blob.

* * * * *